United States Patent
Chino et al.

(10) Patent No.: US 7,067,592 B2
(45) Date of Patent: Jun. 27, 2006

(54) THERMOPLASTIC ELASTOMER COMPOSITION

(75) Inventors: Keisuke Chino, Kanagawa Prefecture (JP); Junichiro Natori, Kanagawa Prefecture (JP)

(73) Assignee: The Yokohama Rubber Co., Ltd. (JP)

( * ) Notice: Subject to any disclaimer, the term of this patent is extended or adjusted under 35 U.S.C. 154(b) by 0 days.

(21) Appl. No.: 10/720,098

(22) Filed: Nov. 25, 2003

(65) Prior Publication Data

US 2004/0106744 A1     Jun. 3, 2004

(30) Foreign Application Priority Data

Dec. 3, 2002    (JP)   ............................. 2002-350818
Jun. 3, 2003    (JP)   ............................. 2003-158258

(51) Int. Cl.
     *C08L 101/02*      (2006.01)
(52) U.S. Cl. ..................... 525/327.6; 524/86; 524/104; 524/99; 525/474
(58) Field of Classification Search ............. 525/327.6, 525/474; 524/86, 104, 99
See application file for complete search history.

(56) References Cited

U.S. PATENT DOCUMENTS

2002/0022700 A1 *    2/2002    Chino et al. ............. 525/327.6
2002/0086952 A1      7/2002    Chino et al.

FOREIGN PATENT DOCUMENTS

JP      2000-169527      6/2000

* cited by examiner

*Primary Examiner*—Kuo-Liang Peng
(74) *Attorney, Agent, or Firm*—Rader, Fishman & Grauer PLLC

(57) ABSTRACT

A thermoplastic elastomer composition includes: a thermoplastic elastomer having a carbonyl-containing group and a nitrogen-containing heterocycle in a side chain thereof; and an amino group-containing compound. The thermoplastic elastomer composition retains excellent recycle property, and also has excellent mechanical characteristics and compression set (shape retention). Thus, it is of extremely superior industrial applicability and environmental protection effect.

18 Claims, No Drawings

THERMOPLASTIC ELASTOMER COMPOSITION

BACKGROUND OF THE INVENTION

1. Field of the Invention

The present invention relates to a thermoplastic elastomer composition having characteristics capable of repeating formation of crosslinking and dissociation of crosslinking with temperature change (hereinafter, also simply referred to as "recycle property"). In particular, the present invention relates to a thermoplastic elastomer composition having excellent mechanical characteristics and compression set (shape retention), without impairing an excellent recycle property.

2. Description of the Related Arts

In recent years, reusage of waste materials is desired in view of environmental protection and resource saving. Vulcanized rubbers have stable three-dimensional networks in which polymer chain and vulcanizing agent are covalently bonded, and therefore show very strong strength, but are difficult to re-mold and reuse due to strongly covalent bond crosslinking. On the other hand, thermoplastic elastomers utilizing physical crosslinking state do not require complicated vulcanization and molding steps including pre-molding and the like, and therefore can easily be molded by heat melting.

Thermoplastic elastomer comprising a resin component and a rubber component, in which a crystaline resin component forms a hard segment which serves as crosslinking part of a three-dimensional structure at room temperature to thereby prevent thermoplastic deformation of a rubber component (soft segment) whereby the thermoplastic elastomer plastically deforms by softening or fusion of the resin component with rising a temperature, is known as the representative example of such thermoplastic elastomers. However, such type of thermoplastic elastomers is liable to decrease rubber elasticity because of containing a resin component. For this reason, materials that do not contain a resin component and can impart thermoplasticity are demanded.

To solve the above problem, the inventors of the present invention previously proposed that an elastomer composition comprising an elastomer having a reaction site capable of forming hydrogen bonds and a compound having a reaction site capable of forming hydrogen bond together with the reaction site of the elastomer can repeats formation of crosslinking and dissociation of crosslinking by temperature difference utilizing hydrogen bond (JP 11-209524 A). Further, the inventors of the present invention proposed a hydrogen-bonding thermoplastic elastomer comprising an elastomeric polymer having a carbonyl-containing group and a heterocyclic amine-containing group in side chains, which is expected to have the similar effect (JP 2000-169527 A). JP 8-239583 A describes metal-containing organic polymer material containing compounds having specified metal elements and organic polymers having a carbonyl-containing group and a nitrogen-containing heterocycle-containing group in side chains, wherein the nitrogen-containing heterocycle-containing ring-containing group is bonded to the main chain directly or through an organic group at a 2-position counted from the nitrogen atom.

Those elastomer compositions or metal-containing organic polymer materials can sufficiently show melt flowability at a molding temperature of a thermoplastic resin such as olefin-based resin without modification, have excellent mechanical strength (breaking strength) at low temperature by the formation of crosslinking, and are capable of repeated reformation of crosslinking and dissociation of crosslinking (softening).

Thermoplastic elastomers having such properties have very high value on industrial utilization and also very high value on environmental protection and are expected for use as a material having further high crosslinking strength and having excellent recycle property, showing no change in physical properties even if formation of crosslinking and dissociation of crosslinking are repeated.

Incidentally, the above-mentioned thermoplastic elastomer (composition) or a metal-containing organic polymer material, with respect to material characteristics thereof, may have insufficient shape retention after loading and insufficient compression set at the time of unloading after loading for a predetermined time period.

Further, metal-containing organic polymer material described in JP 8-239583 A have had the problems such that strength is very small, and the properties are insufficient in using as an elastic material, such as using as a rubber material.

SUMMARY OF THE INVENTION

As a technique of solving the above-mentioned problem, the inventors of the present invention have proposed a thermoplastic elastomer composition including: a thermoplastic elastomer having a carbonyl-containing group and a nitrogen-containing n-membered ring-containing group ($n \geq 3$) on the side chain thereof in which the nitrogen-containing n-membered ring-containing group is bonded to a main chain at 3-position to n-position directly or indirectly through an organic group; and at least one metallic compound selected from those belonging to Groups 2A, 3A, 4A, 5A, 6A, 7A, 8, 1B, 2B, 3B, 4B, and 5B in the periodic table, the composition having hardness sufficient enough to be used as an elastic member, an improved shape retention, and an ability to repeat hardening and fluidization with a temperature change, without impairing an excellent recycle property (JP 2002-317122 A (Japanese Patent Application No. 2001-122598)).

However, in recent years, technological innovation, optimization of materials and so on, simplification and shortening of production process, and so on lead to demands for developed physical properties, characteristics, and so on of the thermoplastic elastomer composition. Under such present conditions, the thermoplastic elastomer having improved material characteristics such as hardness (mechanical characteristics) and compression set (shape retention), without impairing an excellent recycle property has been demanded.

Therefore, it is an object of the present invention to provide a thermoplastic elastomer composition retaining excellent recycle property, and also having excellent mechanical characteristics and compression set (shape retention).

In the present invention, the hardness of the thermoplastic elastomer composition is one of indices for evaluating the mechanical characteristics thereof.

The inventors of the present invention have made extensive studies over and over to solve the above-mentioned problems, and found that a thermoplastic elastomer composition can obtain more improved physical properties such as hardness (mechanical characteristics) and compression set (shape retention) without impairing the recycle property when a thermoplastic elastomer having a carbonyl-containing group and a nitrogen-containing heterocycle in respective side chains thereof is blended with an amino group-containing compound. Thus, the present invention is completed.

Accordingly, the present invention is accomplished based on the above findings and provides the following items (I) to (X):

(I) A thermoplastic elastomer composition including:
a thermoplastic elastomer having a carbonyl-containing group and a nitrogen-containing heterocycle in a side chain thereof; and
an amino group-containing compound.

Here, the amino group-containing compound may be an aliphatic compound (aliphatic (poly)amine), an aromatic compound (aromatic (poly)amine), or a nitrogen-containing heterocyclic amine (heterocyclic amine). The number of amino groups in the compound is preferably 2 or more but is not particularly limited thereto. In addition, the number of primary amino groups in the compound is preferably 2 or less, more preferably 1 or less.

(II) The thermoplastic elastomer composition according to the item (I), in which
the side chain has a structure represented by the following chemical formula (1):

(wherein A represents the nitrogen-containing heterocycle, and B represents: a single bond; an oxygen atom, a nitrogen-containing group, or a sulfur atom; or an organic group which can include the atoms or the group).

(III) The thermoplastic elastomer composition according to the item (I) or (II), in which
the side chain has a structure in which the side chain is bonded to a main chain at α-position or β-position and which is represented by the following chemical formula (2) or (3):

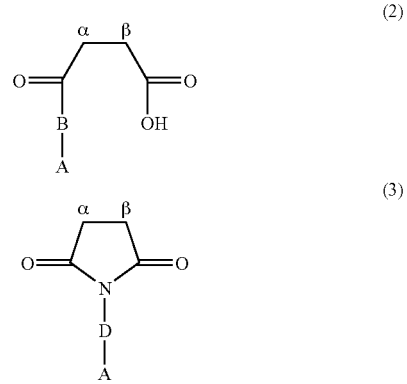

(wherein A represents the nitrogen-containing heterocycle, and B and D independently represent: a single bond; an oxygen atom, a nitrogen-containing group, or a sulfur atom; or an organic group which can include the atoms or the group).

(IV) The thermoplastic elastomer composition according to any one of the items (I) to (III), in which the nitrogen-containing heterocycle is a five-membered ring or a six-membered ring.

(V) The thermoplastic elastomer composition according to the item (IV), in which
the nitrogen-containing heterocycle is selected from the group consisting of a triazole ring, a thiadiazole ring, a pyridine ring, and imidazole ring.

(VI) The thermoplastic elastomer composition according to any one of the items (I) to (V), in which
the amino group-containing compound is selected from the group consisting of a secondary aliphatic diamine, a polyamine containing a primary aromatic amine and a heterocyclic amine, and a tertiary heterocyclic diamine.

Here, the amino group-containing compound may preferably have the number of nitrogen atoms in the amino group-containing compound at a ratio of 0.1 to 8.0 equivalents the side chain containing the carbonyl-containing group and the nitrogen-containing heterocycle introduced into the thermoplastic elastomer upon the blending.

(VII) The thermoplastic elastomer composition according to any one of the items (I) to (V), in which
the amino group-containing compound is polysiloxane having an amino group.

(VIII) The thermoplastic elastomer composition according to the item (VII), in which
the polysiloxane having the amino group is a condensate of an aminosilane compound.

Here, the condensate of the aminosilane compound may be preferably a mono-condensate of a silyl compound having a hydrolyzable substituent and an amino group or a cocondensate of the silyl compound and a silyl compound having no amino group.

(IX) The thermoplastic elastomer composition according to the item (VII) or (VIII), in which
a content of the polysiloxane having the amino group is from 1 to 200 parts by weight with respect to 100 parts by weight of the thermoplastic elastomer.

(X) The thermoplastic elastomer composition according to any one of the items (I) to (IX), further including:
at least one of carbon black and silica in 1 to 200 parts by weight with respect to 100 parts by weight of the thermoplastic elastomer.

DETAILED DESCRIPTION OF THE PREFERRED EMBODIMENTS

Hereinafter, the present invention will be described in detail.

The thermoplastic elastomer composition of the present invention (hereinafter, also simply referred to as "the composition of the present invention" in some cases) is a thermoplastic elastomer composition that contains: a thermoplastic elastomer having a carbonyl-containing group and a nitrogen-containing heterocycle on the respective side chains of the elastomer; and an amino group-containing compound.

Although there are no clear reasons for further improvements in physical properties such as hardness (mechanical characteristics) and compression set (shape retention) without impairment of excellent recycle property in the composition of the present invention, the inventors of the present invention consider such improvements as follows.

Including an amino group-containing compound into the thermoplastic elastomer results in the formation of a bonding (an ionic bond, an interionic interaction, a hydrogen bond, or the like) between the amino group-containing compound and the carbonyl-containing group or the nitrogen-containing heterocycle (hereinafter, also referred to as "a functional group" in some cases) in the thermoplastic elastomer, thereby increasing the crosslinking density of the elastomer. In addition, the formation of the bonding or the like enhances the interaction (hydrogen bond) between the carbonyl-containing group and the nitrogen-containing heterocycle in the thermoplastic elastomer. Therefore, the physical properties such as hardness (mechanical characteristics) and compression set (shape retention) are expected to be improved.

On the other hand, depending on the kind of an amino group in the amino group-containing compound, a bonding between the amino group in the amino group-containing compound and the carbonyl group in the carbonyl-containing group or nitrogen-containing heterocycle becomes strong. Therefore, excellent recycle property or mechanical characteristics of the composition may be impaired.

That is, the present invention is characterized in the use of an amino group-containing compound and an amino group in the compound such as one described later, where a crosslinkage such as an ionic bond or a hydrogen bond formed between the amino group in the amino group-containing compound and the functional group in the thermoplastic elastomer to be mentioned later has a suitable bonding strength of such magnitude that the physical properties such as hardness (mechanical characteristics) and compression set (shape retention) of the composition can be improved without impairing the recycle property of the composition.

At first, description will be made of an amino group-containing compound of a first embodiment of the present invention. A composition in which the amino group-containing compound of the first embodiment is blended retains excellent recycle property and has excellent mechanical characteristics and compression set (shape retention).

The amino group in the amino group-containing compound may be any one of an aliphatic amino group, an aromatic amino group (i.e., an amino group bonded to an aromatic ring), and an amino group that constitutes a nitrogen-containing heterocycle (heterocyclic amine). Alternatively, the amino group may be a mixed amino groups of two or more of those amino groups. A preferable embodiment of the amino group will be described later in the subsequent description of preferred embodiments of the amino group-containing compound.

Furthermore, but not specifically limited, the number of amino groups in the compound has only to be one or more and is preferably two or more. If the compound has two or more amino groups, excellent improvements in physical properties can be effected because the amino groups can form two or more crosslinkages with the thermoplastic elastomer to be described later.

The grade of the amino group is not specifically limited, and may be any one of primary (—NH$_2$), secondary (imino group, >NH), tertiary (>N—), and quaternary (>N$^+$<). The grade can be arbitrarily selected depending on the recycle property and the physical properties such as hardness (mechanical strength) and compression set (shape retention) required for the composition of the present invention. If the secondary amino group is selected, the composition tends to excel in mechanical characteristics. If the tertiary amino group is selected, the composition tends to excel in recycle property.

In particular, if the amino group-containing compound has two secondary amino groups, the composition tends to excel in recycle property and compression set (shape retention) and also in balance between both physical properties.

When the amino group-containing compound contains two or more amino groups, the number of primary amino groups in the compound is preferably two or less, more preferably one or less. If the compound contains three or more primary amino groups, excellent recycle property of the composition may be impaired because the amino groups and the functional group in the thermoplastic elastomer to be described later form a strong bond (crosslinkage), particularly when the carbonyl-containing group in the elastomer is a carboxy groups.

In other words, by considering the bonding strength between the functional group in the thermoplastic elastomer and the amino group in the amino group-containing compound, or the like, the grade of the respective amino groups, the number of amino groups, and the structure of the amino group-containing compound can be suitably adjusted and selected.

Hereinafter, the present invention will be specifically described based on examples of an amino group-containing compound in which the above bonding strength, or the like is suitable. However, the amino group-containing compound of the present invention is not limited to the following examples.

The aliphatic (poly)amines are not particularly limited and may include (poly)amines having 1 to 40 carbon atoms which may be branched, for example.

Examples of the aliphatic monoamines having 1 to 40 carbon atoms may include methylamine, ethylamine, propylamine, butylamine, hexylamine, octylamine, nonylamine, decylamine, dodecylamine, tridecylamine, tetradecylamine, pentadecylamine, hexadecylamine, cetylamine, laurylamine, stearylamine, oleylamine, dimethylamine, trimethylamine, and benzyldimethylamine, which may have a substituent described below.

Examples of the aliphatic polyamines having 1 to 40 carbon atoms may include methylenediamine, ethylenediamine, tetramethyl-1,6-hexanediamine, xylylenediamine, tetramethylxylylenediamine, diethylenetriamine, diethylaminopropylamine, N-aminoethylpiperazine, tris(dimethylaminomethyl)phenol, triethylenetetramine, N,N'-dimethylethylenediamine, N,N'-diethylethylenediamine, N,N'-diisopropylethylenediamine, N,N'-dimethyl-1,3-propanediamine, N,N'-diethyl-1,3-propanediamine, N,N'-diisopropyl-1,3-propanediamine, N,N'-dimethyl-1,6-hexanediamine, N,N'-diethyl-1,6-hexanediamine, and N,N',N"-trimethylbis(hexamethylene)triamine, which may have a substituent described below.

The above aliphatic amines having 1 to 40 carbon atoms include constitutional isomers thereof.

The aromatic (poly)amines and heterocyclic amines are not particularly limited and may include (poly)amines having 5 to 40 carbon atoms, for example.

Examples of the aromatic (poly)amines and heterocyclic amines may include dipyridylamine, dipyridyl, ethylenedipyridyl, trimethylenedipyridyl, phenazine, purine, pteridin, dipyridylamine, 1,2-bis-(4-pyridyl)-ethane, 2 (or 4)-(β-hydroxyethyl)-pyridine, 2 (or 4)-(2-aminoethyl)-pyridine, 2 (or 4)-aminopyridine, 2,6-diaminopyridine, 2-amino-6-hydroxypyridine, 6-azathymine, metaphenylenediamine, diaminodiphenylmethane, diaminodiphenylsulfone, and 3-amino-1,2,4-triazole, which may have a substituent described below; and compounds exemplified as nitrogen-containing heterocycles in the thermoplastic elastomers described below, which may have a substituent described below.

One or more hydrogen atoms of the above-mentioned amino group-containing compounds may be substituted by an alkyl group, an alkylene group, an aralkylene group, an oxy group, an acyl group, a halogen atom, etc., while the skeletons of the compounds may include a hetro atom such as an oxygen atom or a sulfur atom.

The above-mentioned amino group-containing compound may be used alone or the two or more compounds may be used in combination. In the case where the two or more compounds are used in combination, the mixing ratio may be any ratio depending on the application of the compositions, physical properties required for the compositions, etc.

Among the above-mentioned amino group-containing compounds, secondary aliphatic diamines such as N,N'-dimethylethylenediamine, N,N'-diethylethylenediamine, N,N'-diisopropylethylenediamine, N,N'-dimethyl-1,3-propanediamine, N,N'-diethyl-1,3-propanediamine, N,N'-diisopropyl-1,3-propanediamine, N,N'-dimethyl-1,6-hexanediamine, N,N'-diethyl-1,6-hexanediamine, and N,N',N''-trimethylbis(hexamethylene)triamine; tertiary aliphatic diamines such as tetramethyl-1,6-hexanediamine; polyamines containing an primary aromatic amine and a heterocyclic amine such as aminotriazole and aminopyridine; linear chain alkylmonoamines such as dodecylamine; tertiary heterocyclic diamines such as dipyridyl; and the like are preferable because effects of improving the hardness (mechanical characteristic), compression set (shape retention), etc. are highly enhanced.

Furthermore, secondary aliphatic diamines, polyamines containing a primary aromatic amine and a heterocyclic amine, and tertiary heterocyclic diamines are more preferred.

The content of the amino group-containing compound depends on the number of nitrogen atoms in the compound. Preferably, the number of nitrogen atoms in the compound is 0.1 to 8.0 equivalents with respect to a side chain that contains a carbonyl-containing group and a nitrogen-containing heterocycle introduced into the thermoplastic elastomer to be described later. As long as the content is within this range, the crosslinking density between the compound and the thermoplastic elastomer does not become excessive, so that the composition will excel in recycle property, mechanical characteristics, and compression set (shape retention).

In terms of excelling in recycle property, mechanical characteristics, and compression set (shape retention), the content of the amino group-containing compound in the composition is more preferably 0.3 to 6.0 equivalents, particularly preferably 0.4 to 4.0 equivalents.

When the amino group-containing compound is aliphatic diamine, for instance, the compound contains two nitrogen atoms. Therefore, the content of the amino group-containing compound is preferably 0.05 to 4.0 fold moles, more preferably 0.15 to 3.0 fold moles, particularly preferably 0.2 to 2.0 fold moles with respect to the above side chain.

When aminotriazole is used as the amino group-containing compound, the content of the amino group-containing compound is preferably more than 2.0 equivalents but 10.0 equivalents or less, more preferably 2.5 to 9.0 equivalents, particularly preferably 3.0 to 8.0 equivalents with respect to the above side chain.

Specifically, the aminotriazole contains four nitrogen atoms, so that the content of the aminotriazole is preferably more than 0.5 fold moles but 2.5 fold moles or less, more preferably 0.6 to 2.25 fold moles, particularly preferably 0.75 to 2.0 fold moles with respect to the above side chain.

As the content of the amino group-containing compound increases, the composition tends to excel in mechanical characteristics and compression set (shape retention). In this case, on the other hand, the composition tends to soften (hereinafter, also referred to as "a softening temperature" in some cases) at higher temperatures.

In other words, the content of the amino group-containing compound can be adjusted to a given content that exerts suitable physical properties in consideration of the above tendencies depending on the application in which the composition of the present invention is used, the desired physical properties, and so on.

Next, description will be made of an amino group-containing compound of a second embodiment of the present invention.

The amino group-containing compound of the second embodiment of the present invention is a high molecular compound (polymer) having an amino group. A composition in which the amino group-containing compound of the second embodiment is blended retains excellent recycle property and has excellent mechanical characteristics and compression set (shape retention).

The amino group in the amino-containing compound of the second embodiment is not particularly limited. Examples of such an amino group include an aliphatic amino group, an aromatic amino group, an amino group that constitutes a nitrogen-containing heterocycle (heterocyclic amine), and mixed amino groups of two or more of these amino groups.

Of those, the aliphatic amino group is preferable in that the aliphatic amino group can be effectively dispersed in an elastomer to be used in the present invention by appropriately forming an interaction with the elastomer and the aliphatic amino group exerts a great effect on improvements in the physical properties such as compression set.

The number of amino groups in the compound is not particularly limited. The compound has only to contain at least one amino group. Preferably, the compound may contain two or more amino groups in that excellent effects can be obtained for the improvements of mechanical characteristics, compression set, and so on of a composition to be obtained because the amino groups are capable of forming a plurality of crosslinkages. The number of the amino groups may be a given number depending on the application in which the composition is used, the physical properties required for the composition, and so on. In general, however, a weight ratio of the weight of the amino group (the weight of nitrogen atom) to the total weight of polymer is preferably 0.1% by weight or more, more preferably 1% by weight or more, particularly preferably 10% by weight or more.

In addition, for example, the weight ratio can be measured by the nuclear magnetic resonance analysis (NMR), the infrared spectroscopic analysis (IR), or the like.

The grade of the amino group is not specifically limited, and may be any one of primary ($-NH_2$), secondary (imino group, $>NH$), tertiary ($>N-$), and quaternary ($>N^{30} <$). If the grade of the amino group is primary, the amino group tends to enhance an interaction with the elastomer to be used in the present invention, and the composition may be gelatinized depending on the conditions at the time of preparing the composition, and so on. On the other hand, if the grade of the amino group is tertiary, the amino group tends to weaken the interaction with the elastomer to be used in the present invention, and the effects of improving compression set and so on may be small when the amino group is provided for the composition.

From the above viewpoint, preferably, the grade of the amino group is primary or secondary.

In other words, the amino group is preferably a primary or secondary aliphatic amino group.

When the composition contains two or more amino groups, at least one of these amino groups is preferably an aliphatic amino group, more preferably a primary or secondary aliphatic amino group.

The species, grade, and number of amino groups can be arbitrarily adjusted depending on the characteristics of the composition.

The amino group-containing compound of the second embodiment as described above is not particularly limited, and examples thereof include: polymers such as polyamide, polyurethane, a urea resin, a melamine resin, polyvinylamine, polyallylamine, polyacrylamide, polymethacrylamide, polyaminostyrene, and amino group-containing polysiloxane; and polymers obtained by modifying various kinds of polymers with respective compounds having amino groups.

The physical properties of each of those polymers, such as average molecular weight, molecular-weight distribution, and viscosity, are not particularly limited and can be arbitrary defined depending on the application in which the composition is used, the desired physical properties of the composition, and so on.

Furthermore, the examples of the amino group in the amino group-containing compound of the second embodiment include amino groups in an amide bond, a urethane bond, a urea bond, or the like.

Among the polymers described above, in the present invention, a more preferable polymer is one obtained by polymerizing (polyadding or polycondensing) a condensable or polymerizable compound (monomer) having an amino group. Of those, in terms of easy availability and production, and easy adjustment of a molecular weight and the amount of the amino group of the polymer, and so on, particularly preferable is polysiloxane having an amino group, which is a condensate of a silyl compound having a hydrolyzable substituent and an amino group, or a cocondensate between the silyl compound and another silyl compound having no amino group.

The aforementioned silyl compounds containing a hydrolyzable substituent and an amino group serving as a raw material of the above polysiloxane having an amino group are not particularly limited and preferably include aminosilane compounds. Specific examples thereof may include aminosilane compounds having an aliphatic primary amino group such as γ-aminopropyltrimethoxysilane, γ-aminopropyltriethoxysilane, γ-aminopropylmethyldimethoxysilane, γ-aminopropylmethyldiethoxysilane, and 4-amino-3,3-dimethylbutyltrimethoxysilane (which are all produced by Nippon Unicar Co., Ltd.); amino silane compounds having a secondary aliphatic amino group such as N,N-bis[(3-trimethoxysilyl)propyl]amine, N,N-bis[(3-triethoxysilyl)propyl]amine, N,N—bis[(3-tripropoxysilyl)propyl]amine (which are all produced by Nippon Unicar Co., Ltd.), 3-(n-butylamino)propyltrimethoxysilane (Dynasilane 1189 (produced by Degussa-Huls AG Corporation)), and N-ethyl-aminoisobutyltrimethoxysilane (Silquest A-Link 15 silane, produced by OSi Specialties Co., Ltd.); amino silane compounds having an primary aliphatic amino group and a secondary aliphatic amino group such as N-(β-aminoethyl)-γ-aminopropylmethyldimethoxysilane, N-(β-aminoethyl)-γ-aminopropyltrimethoxysilane, and N-(β-aminoethyl)-γ-aminopropyltriethoxysilane (produced by Nippon Unicar Co., Ltd.); amino silane compounds having a secondary aromatic amino group such as N-phenyl-γ-aminopropyltrimethoxysilane (produced by Nippon Unicar Co., Ltd.); and amino silane compounds having a heterocyclic amino group such as imidazoletrimethoxysilane (produced by Japan Energy Co., Ltd.), and triazolesilane obtained by reacting aminotriazole with epoxysilane compounds, isocyanate silane compounds, or the like in the presence or absence of a catalyst at a temperature equal to or higher than room temperature.

Of those, aminoalkylsilane compounds such as the aminosilane compounds having a primary aliphatic amino group, the aminosilane compounds having a secondary aliphatic amino group, and the aminosilane compounds having a primary aliphatic amino group and a secondary aliphatic amino group are preferable because the effects of improving the physical properties such as compression set can be highly enhanced.

The above-mentioned silyl compounds having no amino group are not particularly limited so long as the compounds differ from the above-mentioned silyl compounds having a hydrolyzable substituent and an amino group, and have no amino group. Examples thereof may include alkoxysilane compounds and halogenated silane compounds. Of those, alkoxysilane compounds are preferable because the compounds are widely available and easy to handle, and a cocondensate to be obtained has an excellent physical property.

Examples of the halogenated silane compounds include, although not limited thereto, tetrachlorosilane and vinyltrifluorosilane.

Examples of the alkoxysilane compounds include, although not limited thereto, tetramethoxysilane, tetraethoxysilane, tetrabutoxysilane, tetraisopropoxysilane, methyltrimethoxysilane, methyltriethoxysilane, methyltributoxysilane, methyltriisopropoxysilane, phenyltrimethoxysilane, and dimethyldimethoxysilane.

Of those, tetraethoxysilane and tetramethoxysilane are preferable because of their low costs and safety in their handling and so on.

The silyl compound having a hydrolyzable substituent and an amino group and the silyl compound having no amino group can be used independently, or two or more of them can be used in combination with each other.

The production of polysiloxane having an amino group, which is a condensate of a silyl compound containing a hydrolyzable substituent and an amino group, or a cocondensate between the silyl compound and another silyl compound having no amino group described above is not particularly limited. The production can be performed according to any conventional method for producing polysiloxane under conventional conditions or the like.

For example, when the polysiloxane having an amino group is the condensate described above, the condensate can be produced by adding a catalyst (e.g., acid or base) to the silyl compound as required using more than a required amount of water as a solvent, followed by stirring at room temperature or under heating. When the polysiloxane having an amino group is the cocondensate described above, the condensate can be produced by placing the silyl compound having a hydrolyzable substituent and an amino group and the silyl compound having no amino group in an appropriate solvent (water is preferable) and by adding, if required, a catalyst (e.g., acid or base) to the solvent, followed by stirring at room temperature or under heating. In the case of the cocondensate, it is preferable that the hydrolyzable substituents in both compounds be identical with each other in that condensation speeds of both compounds are set to be comparable to each other to obtain a uniform random cocondensate.

In the cocondensate described above, a mixing ratio between the silyl compound having a hydrolyzalbe substituent and an amino group and the silyl compound having no amino group is not specifically limited. The mixing ratio can be arbitrarily selected as far as the above-mentioned weight ratio of the weight of the amino group to the total weight of the polymer is satisfied. Preferably, the content of the silyl compound having an amino group is 1% by weight or more because an excellent effect of improving compression set or the like can be obtained.

The structure of the polysiloxane having an amino group thus obtained is not specifically limited, and may be any one of a linear chain structure, a branched chain structure, a three-dimensional network structure, a spherical structure, or a combination thereof. For advantageously using the amino group to the interaction with the thermoplastic elastomer to be used in the present invention as described later, the liner chain structure, the branched chain structure, or the three-dimensional network structure is preferable.

Alternatively, the polysiloxane having an amino group may be one commercially available.

The amino group-containing compound of the second embodiment of the present invention may be used independently or in combination with one or more other amino group-containing compounds. The mixing ratio between two or more amino group-containing compounds can be arbitrary determined depending on the application in which the composition is used, the required physical properties of the composition, and so on.

The content of the amino group-containing compound of the second embodiment of the present invention can be defined by the number of nitrogen atoms (equivalents) in the compound with respect to the side chain having the carbonyl-containing group and the nitrogen-containing heterocycle introduced into the thermoplastic elastomer to be described later. However, there may exist an amino group that cannot form an interaction with the elastomer effectively because of the structure, the molecular weight, or the like of the compound. Therefore, the content of the compound is preferably 1 to 200 parts by weight, more preferably 5 parts by weight or more, particularly preferably 10 parts by weight with respect to 100 parts by weight of the elastomer to be used in the present invention.

The composition of the present invention includes a thermoplastic elastomer that contains a carbonyl-containing group and a nitrogen-containing heterocycle on the side chain.

The thermoplastic elastomer contains a carbonyl-containing group and a nitrogen-containing heterocycle on the side chain of an elastomeric polymer, which is a natural or synthetic polymer.

In the present invention, the term "side chain" means the side chain and the terminal of the elastomeric polymer. In addition, the phrase "the carbonyl-containing group and the nitrogen-containing heterocycle are included on the side chain" means that the carbonyl-containing group and the nitrogen-containing heterocycle are bonded (covalent bond) in a chemically stable state to the atoms (generally carbon atoms) that form the main chain of an elastomeric polymer.

The elastomeric polymer to be provided as a main chain of the thermoplastic elastomer is not specifically limited, but may be a natural polymer or a synthetic polymer generally known in the art. However, it is preferable to use a polymer having a glass transition temperature equal to or less than room temperature (25° C.), that is, elastomer. The term "glass transition temperature" used herein refers to a glass transition temperature measured by differential scanning calorimetry (DSC). The rate of temperature rise is 10° C./min.

As this type of elastomeric polymer, specifically, for example, diene rubbers such as natural rubber (NR), isoprene rubber (IR), butadiene rubber (BR), 1,2-butadiene rubber (1,2-BR), styrene-butadiene rubber (SBR), acrylonitrile-butadiene rubber (NBR), chloroprene rubber, butyl rubber (isobutylene-isoprene rubber IIR), and ethylene-propylene-diene rubber (EPDM) and those hydrogenated diene rubbers; olefin rubbers such as ethylene-propylene rubber (EPM), ethylene-butene rubber (EBM), chlorosulfonated polyethylene, Ethylene-vinylacetate rubber (EVA), acrylic rubber (ACM), Ethylene-Acrylic rubber (AEM), flourocarbon rubber, polyethylene rubber, and polypropylene rubber; epichlorohydrin rubber; polysulfide rubber; silicone rubber; and urethane rubber can be given.

Further, the elastomeric polymer to form a main chain may be an elastomeric polymer containing a resin component(thermoplastic elastomer). For example, polystyrene elastomeric polymers (e.g., SBS, SIS or SEBS), polyolefin elastomeric polymers, polyvinyl chloride elastomeric polymers, polyurethane elastomeric polymers, polyester elastomeric polymers, polyamide elastomeric polymers, or hydrogenated elastomeric polymers of those polymer can be given.

The elastomeric polymer may be either liquid or solid. Molecular weight of the elastomeric polymer is not particularly limited, and can be appropriately determined according to the application of the composition, and the physical property such as crosslinking density required for the composition.

In the case where flowability when heating the composition of the present invention (decrosslinking) is considered important, the elastomeric polymer is preferably liquid. For example, in diene rubbers such as isoprene rubber or butadiene rubber, a weight average molecular weight is preferably 1,000 to 100,000, more preferably about 1,000 to 50,000. On the other hand, when strength of the composition of the present invention is considered important, the elastomeric polymer is preferably solid rubber. For example, in diene rubbers such as isoprene rubber or butadiene rubber, a weight average molecular weight is preferably more than 100,000 , more preferably 500,000 to. 1,500,000. The term "weight average molecular weight" used herein refers to a weight average molecular weight (in terms of polystylene) as measured by gel permeation chromatography (GPC). Tetrahydrofuran (THF) is used as a solvent in the measurement.

In the present invention, two or more of the above-mentioned elastomeric polymers can be used in mixture. In this case, the mixing ratio thereof may be any ratio depending on the application of the composition, physical properties required for the composition, and so on.

Furthermore, the glass transition temperature of the elastomeric polymer to be used in the present invention is preferably 25° C. or less. It is preferable that at least one of the glass transition temperatures is 25° C. or less when the polymer has two or more glass transition temperatures or two or more polymers are used in combination. In this range, the resulting molded product shows the rubber-like elasticity at room temperature.

It is particularly preferable that the elastomeric polymers are diene rubbers such as natural rubber (NR), isoprene rubber (IR), butadiene rubber (BR), 1,2-butadiene rubber (1,2-BR), styrene-butadiene rubber (SBR), acrylonitrile-butadiene rubber (NBR), ethylene-propylene-diene rubber (EPDM), and butyl rubber (IIR), and those hydrogenated diene rubbers; olefin rubbers such as ethylene-propylene rubber (EPM) and ethylene-butene rubber (EBM), Ethylene-vinylacetate rubber (EVA), acrylic rubber (ACM), Ethylene-Acrylic rubber (AEM). Each of the polymers has a glass transition temperature of 25° C. or less, showing the rubber-like elasticity at room temperature. Also, modification in maleic anhydride described below can easily occur when diene rubbers are used. The composition has more excellent tensile strength at the time of crosslinking thereof when olefin rubbers are used, so that the deterioration of the composition can be inhibited.

In the present invention, although not specifically limited, the bound styrene content in the styrene-butadiene rubber (SBR), the bound acrylonitrile content in the acrylonitrile-butadiene rubber (NBR), the hydrogenation ratio of a hydrogenated elastomeric polymer, and so on can be adjusted to any ratio depending on the application of the composition of the present invention, the physical properties required for the composition of the present invention, and so on.

When EPM, EPDM, and EBM are used for the main chain of a thermoplastic elastomer, the content of ethylene thereof is preferably 10 to 80 mol %, more preferably 40 to 60 mol %. If the content falls within this range, the resulting composition may be satisfactory in terms of compression set and mechanical strength.

The thermoplastic elastomer of the present invention has a carbonyl-containing group and a nitrogen-containing heterocycle in the side chain of an elastomeric polymer.

The carbonyl-containing group may be any group as far as it contains a carbonyl group, for example, an amide group, an ester group, an imide group, a carboxy group, or a carbonyl group. The compound in which such a group can be introduced is not particularly limited but may be, for example, ketones, carboxylic acids and the derivatives thereof.

The carboxylic acids may be, for example, organic acid having a saturated or unsaturated hydrocarbon group. The hydrocarbon group may be any of aliphatic, alicyclic, aromatic, and so on. In addition, for example, the carboxylic acid derivatives include carboxylic acid anhydrides, amino acids, thiocarboxylic acids (mercapto group-containing carboxylic acids), esters, amino acids, ketones, amides, imides, dicarboxylic acids, and the monoesters thereof.

Specific examples of carboxylic acids and the derivatives thereof include: carboxylic acids such as malonic acid, maleic acid, succinic acid, glutaric acid, phthalic acid, isophthalic acid, terephthalic acid, p-phenylenediacetic acid, p-hydroxybenzoic acid, p-aminobenzoic acid, or mercaptoacetic acid, and substituent-containing carboxylic acids; acid anhydrides such as succinic anhydride, maleic anhydride, glutaric anhydride, phthalic anhydride, propionic anhydride, or benzoic anhydride; aliphatic esters such as maleic ester, malonic ester, succinic ester, glutaric ester or ethyl acetate; aromatic esters such as phthalic acid ester, isophthalic acid ester, terephthalic acid ester, ethyl m-aminobenzoate or methyl p-hydroxybenzoate; ketones such as quinone, anthraquinone or naphthoquinone; amino acids such as glycine, tyrosine, vicine, alanine, valine, leucine, serine, threonine, lysine, asparaginic acid, glutamic acid, cysteine, methionine, proline or N-(p-aminobenzoyl)-β-alanine; amides such as maleinamide, maleinamic acid (maleic acid monoamide), succinic monoamide, 5-hydroxy valeramide, N-acetylethanol amine, N,N'-hexamethylenebis(acetamide), malonamide, cycloserine, 4-acetamide phenol or p-acetamidobenzoic acid; and imides such as maleimide succinimide or urazole(3,5-dioxo-1,2,4-triazolidine).

Of those, as the compound in which the carbonyl group (carbonyl-containing group) can be introduced, cyclic acid anhydrides such as succinic anhydride, maleic anhydride, glutaric anhydride, or phthalic anhydride; and imides such as urazole are preferable, and particularly, maleic anhydride and urazole are more preferable.

The nitrogen-containing heterocycle contained in the side chain of the thermoplastic elastomer can be introduced into the main chain directly or indirectly though an organic group.

The applicable nitrogen-containing heterocycle containing a nitrogen atom in its heterocycle may additionally contain a hetero atom such as sulfur atom, oxygen atom, or phosphorus atom except a nitrogen atom in the heterocycle. Here, the nitrogen-containing heterocycle is used because when the heterocycle structure is formed, tensile strength of the composition is increased as a result of an increase in the strength of hydrogen bond that forms the crosslinking described later.

Further, the aforementioned heterocycle may have a substituent. Examples thereof include: alkyl groups such as methyl group, ethyl group, (iso)propyl group or hexyl group; alkoxy groups such as methoxy group, ethoxy group or (iso)propoxy group; groups including halogen atoms such as fluorine atom, chlorine atom, bromine atom or iodine atom; cyano groups; amino groups; aromatic hydrocarbon groups; ester groups; ether groups; acyl groups; or thioether groups. Those groups can be used in combination.

Substitution position of those substituents is not particularly limited, and the number of substituents is also not limited. The heterocycle may or may not have aromaticity, but preferably has the aromaticity in that tensile strength at the time of crosslinking is further increased to improve the strength of the resulting product.

It is preferable to use 5- or 6-membered ring as nitrogen-containing heterocycle.

Specific examples of nitrogen-containing heterocycles include: pyrrololine, pyrrolidone, oxyindole (2-oxyindole), indoxyl (3-oxyindoxyl), dioxyindole, isatin, indolyl, phthalimidine, β-isoindigo, monoporphyrin, diporphyrin, triporphyrin, azaporphyrin, phthalocyanine, hemoglobin, uroporphyrin, chlorophyll, phylloerythlin, imidazole, pyrazole, triazole, tetrazole, benzimidazole, benzopyrazole, benzotriazole, imidazoline, imidazolone, imidazolidone, hydantoin, pyrazoline, pyrazolone, pyrazolidine, indazole, pyridoindole, purine, cinnoline, pyrrole, pyrroline, indole, indoline, oxindole, carbazole, phenothiazine, indolenine, isoindole, oxazoles, thiazoles, isooxazoles, isothiazole, oxadiazole, thiadiazole, oxatriazole, thiatriazole, phenanthroline, oxazine, benzoxazine, phthalazine, pteridine, pyrazine, phenazine, tetrazine, benzoxazole, benzoisooxazole, anthranyl, benzothiazole, benzofurazane, pyridine, quinoline, isoquinoline, acridine, phenanthridine, anthrazoline, naphthilidine, thiazine, pyridazine, pyrimidine, quinazoline, quinoxaline, triazine, histidine, triazolidine, melamine, adenine, guanine, thymine, cytosine, urazole and the like. Among these nitrogen-containing heterocycles, in particular, with respect to nitrogen-containing 5-membered ring, the following compounds may be preferably exemplified. The compounds may have various kinds of substituents as described above, or may be the ones having the hydrogen atom added thereto (the compounds may be reduced) or removed therefrom (the compounds may be oxidized).

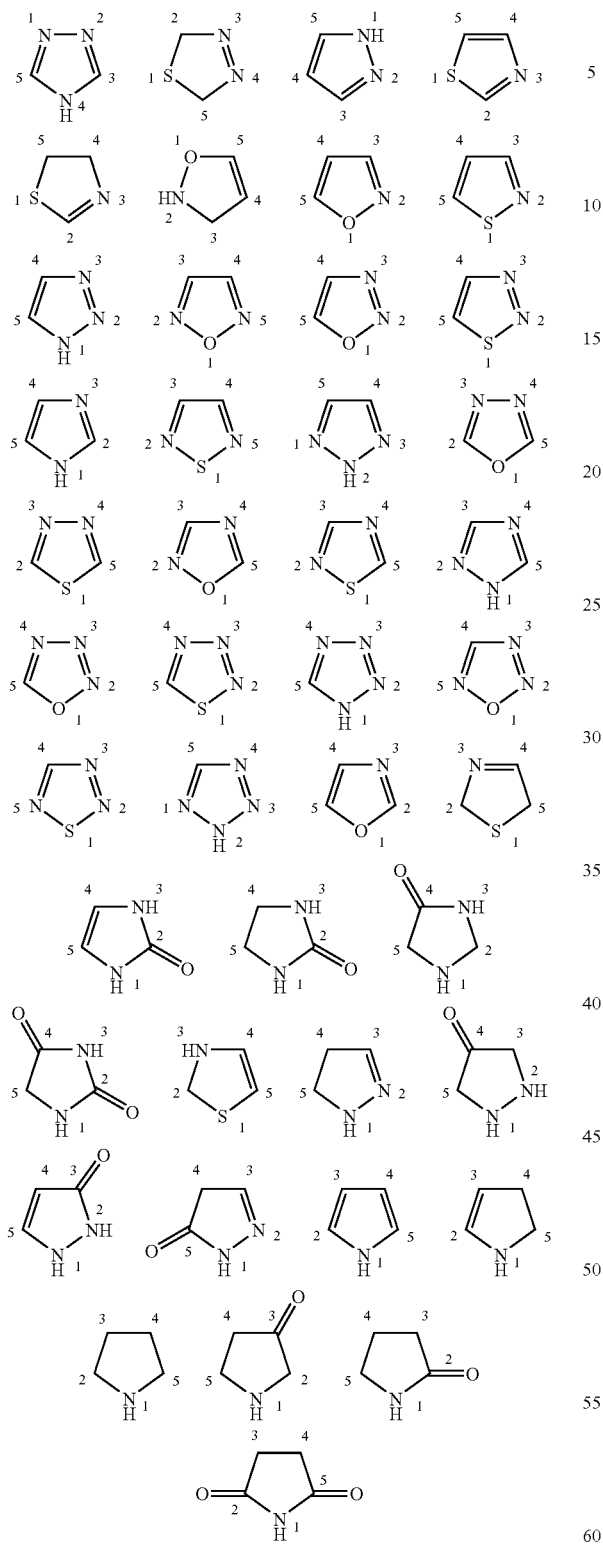

As for the nitrogen-containing 6-membered ring, the following compounds may be preferably exemplified. In this case, such a compound may have various kinds of substituents described above, or may be the one subjected to the addition or removable of a hydrogen atom.

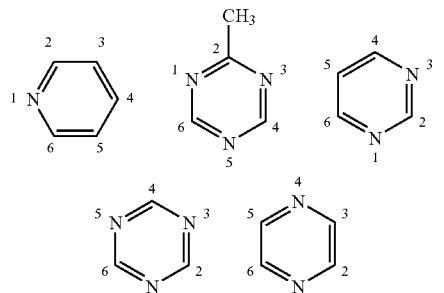

In addition, a compound prepared by a condensation between the above-mentioned nitrogen-containing heterocycle and a benzene ring or a nitrogen-containing heterocycle may be used. For example, the following condensed ring can be preferably used. Such a compound may also have the various kinds of substituents described above, or the hydrogen atom may be added or removed.

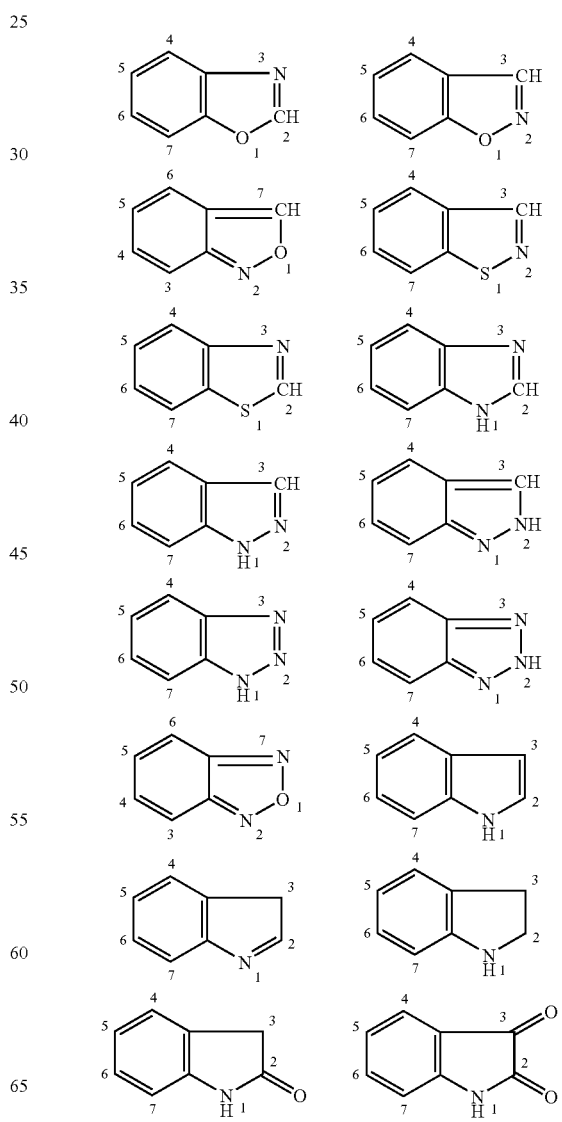

-continued

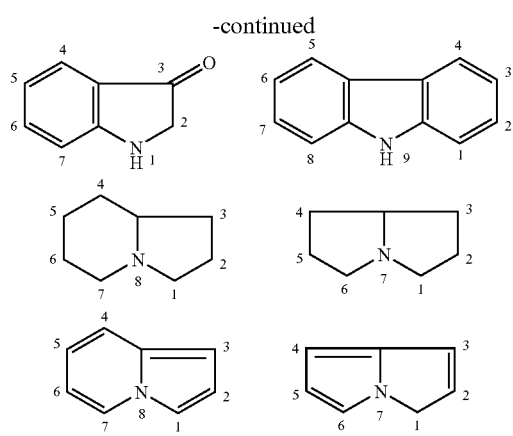

Among the nitrogen-containing heterocycles described above, the one having triazole ring, pyridine ring, thiadiazole ring or imidazole ring is preferable because it provides a thermoplastic elastomer composition with superior mechanical strength, shape retention, compression set, and recycle properties.

In the thermoplastic elastomer of the present invention, the above-mentioned nitrogen-containing heterocycle is introduced into a main chain thereof directly or indirectly through an organic group, preferably introduced into the main chain through the organic group.

In addition, as for the thermoplastic elastomer of the present invention, the carbonyl-containing group and the nitrogen-containing heterocycle may form independent side chains and may be introduced into main chain. Alternatively, the carbonyl-containing group and the nitrogen-containing heterocycle may be bonded on one side chain through different groups and introduced into the main chain.

The carbonyl-containing group and the nitrogen-containing heterocycle may be preferably introduced into the above-mentioned polymer main chain through an organic group as a side chain represented by the following formula (1).

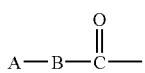

(1)

(wherein A represents a nitrogen-containing heterocycle, and B represents: a single bond; an oxygen atom, a nitrogen-containing group, or a sulfur atom; or an organic group which may include the atoms or the groups)

Here, to be specific, the nitrogen-containing heterocycle A is the nitrogen-containing heterocycle described above.

"B" represents a single bond; an oxygen atom, a nitrogen-containing group, or a sulfur atom; or an organic group that may contain those atoms or the group. Specifically, indicated by B is, for example, a single bond;

an oxygen atom, a sulfur atom, or an amino group NR' (R' is a hydrogen atom or an alkyl group having 1 to 10 carbon atoms);

an alkylene group or aralkylene group having 1 to 20 carbon atoms, which may contain those atoms or the group;

an alkylene ether group having 1 to 20 carbon atoms (alkylene oxy group, such as —O—CH$_2$CH$_2$— group), an alkylene amino group (such as —NH—CH$_2$CH$_2$— group), or an alkylene thioether group (alkylene thio group, such as —S—CH$_2$CH$_2$— group), which contain those atoms or the group on the terminal; or an aralkylene ether group (aralkylene oxy group), an aralkylene amino group, or aralkylene thioether group, having those atoms or the group on its terminal and having 1 to 20 carbon atoms.

Here, as the alkyl group having 1 to 10 carbon atoms of the amino group NR', there can be exemplified methyl group, ethyl group, propyl group butyl group, pentyl group, hexyl group, heptyl group, octyl group, nonyl group, or decyl group including isomers.

It is preferable that the oxygen atom, the sulfur atom, and the amino group of B described above, or an oxygen atom, a nitrogen-containing group, and a sulfur atom in an alkylene ether or aralkylene ether group or the like having 1 to 20 carbon atoms, in which an oxygen atom, a nitrogen-containing group, or a sulfur atom may be included, are combined with the adjacent carbonyl group to form an conjugated ester group, an conjugated amide group, an conjugated imide group, and a conjugated thioester group, respectively.

Among them, in particular, B is preferably one that forms a conjugate system, such as oxygen atom, sulfur atom, or amino group, or one having them on the terminal thereof, such as an alkylene ether group, an alkylene amino group, or an alkylene thioether group having 1 to 20 carbon atoms. It is particularly preferable to use amino group (NH), alkylene amino group (—NH—CH$_2$— group, —NH—CH$_2$CH$_2$— group, or —NH—CH$_2$CH$_2$CH$_2$— group), and alkylene ether group (—O—CH$_2$— group, —O—CH$_2$CH$_2$— group, or —O—CH$_2$CH$_2$CH$_2$— group)

It is preferable that the carbonyl-containing group and the nitrogen-containing heterocycle are introduced as one side chain represented by the following formula (2) or (3) into the main chain of the above-mentioned polymer at an α-position or a β-position.

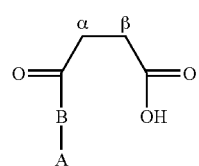

(2)

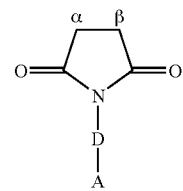

(3)

(wherein A represents a nitrogen-containing heterocycle, and B and D independently represent: a single bond; an oxygen atom, a nitrogen-containing group, or a sulfur atom; or an organic group which may include those atoms or the group)

Here, the nitrogen-containing heterocycle A is basically similar to the nitrogen-containing heterocycle A of the above-mentioned formula (1). B and D are independently and basically similar to B of the above-mentioned formula (1).

However, among the examples of B of the above-mentioned formula (1), D in the formula (3) is preferably one that forms a conjugated system, such as a single bond; or an alkylene group or aralkylene group having 1 to 20 carbon atoms, which may include an oxygen atom, a nitrogen-containing group, or a sulfur atom. More particularly, the single bond is preferable. In other words, with the imide nitrogen of the above-mentioned formula (3), it is preferable to form an alkylene amino group or an aralkylene amino group having 1 to 20 carbon atoms, which may include an oxygen atom, a nitrogen-containing group, or a sulfur atom. In particular, it is preferable to directly bond imide nitrogen of the above-mentioned formula (3) with a nitrogen-containing heterocycle (single bond). Specifically, D is a single bond; an alkylene ether group, an alkylene amino group, an alkylene thioether group, or an aralkylene ether group, an aralkylene amino group, an aralkylene thioether group, having 1 to 20 carbon atoms, having an oxygen atom, a sulfur atom or a nitrogen-containing group in terminal; or methylene group, ethylene group, propylene group, butylene group, hexylene group, phenylene group, xylylene group, or the like, including isomers.

A ratio between the above-mentioned carbonyl-containing group and the above-mentioned nitrogen-containing heterocycle contained in the thermoplastic elastomer is not particularly limited, but when it is 2:1 (in the case of the imide structure of the above-mentioned formula (3), 1:1), complementary interaction is easy to obtain and, in addition, the elastomer can be easily produced, so that the ratio is preferable.

The side chains having both carbonyl-containing group and nitrogen-containing heterocycle are preferably introduced at a ratio (induction ratio) of 0.1 to 50 mol %, more preferably 1 to 30 mol % with respect to 100 mol % of constituent monomer of the main chain.

If it is less than 0.1 mol %, a sufficient strength at the time of crosslinking cannot be obtained in some cases. If it is higher than 50 mol %, the crosslinking density increases and the rubber elasticity tends to be impaired. In other words, within the above-mentioned range, interaction between side chains of the thermoplastic elastomer occurs between molecules or inside a molecule. The crosslinking by above-mentioned interaction is formed in a well-balanced manner, so that an extremely high tensile strength at the time of crosslinking is obtained with good recycle property when the composition is prepared.

When the carbonyl-containing group and the nitrogen-containing heterocycle are introduced independently, both groups may be considered as a pair on the basis of the ratio of the carbonyl-containing group and the nitrogen-containing heterocycle. If one of these groups is excessively contained, the group with higher content may be considered as criteria.

The induction ratio may be represented such that the amount of monomer introduced in the side chain portion is almost 0.1 to 50 units with respect to 100 units of ethylene and propylene monomer, for example when the main chain portion is an ethylene-propylene rubber.

The glass transition temperature of the thermoplastic elastomer is preferably 25° C. or less. When the elastomer has two or more glass transition temperatures or when two or more elastomers are used together, at least one of the glass transition temperatures is preferably 25° C. or less. When the glass transition temperature is 25° C. or less, the molded product shows a rubber-like elasticity at room temperature.

A method of producing the thermoplastic elastomer is not particularly limited, so that a general method can be used. Among the thermoplastic elastomers, for example, one having the carbonyl-containing group and the nitrogen-containing heterocycle in the same side chain can be obtained by reacting a carbonyl-containing group modified polymer of the elastomeric polymer with a compound in which a nitrogen-containing heterocycle can be introduced.

Specifically, diene rubber such as butadiene rubber and a toluene solution that contains maleic anhydride or mercaptoacetic acid, or olefin rubber such as EPM, for example, α-olefin of propylene and a toluene solution that contains mercaptoacetic acid, are reacted at room temperature or under heating in a nitrogen atmosphere to obtain an elastomer modified with a carbonyl-containing group. Subsequently, the resulting elastomer is reacted with a compound in which a nitrogen-containing heterocycle can be introduced, to thereby obtain the target product.

Here, the term "compound in which a nitrogen-containing heterocycle can be introduced" used herein may refer to a nitrogen-containing heterocycle itself, or a nitrogen-containing heterocycle having a substitute (e.g., hydroxyl group, thiol group, and amino group) to be reacted with a carbonyl-containing group such as maleic anhydride. In addition, a part of or total amount of the carbonyl-containing group of the carbonyl-containing group modified elastomer may be reacted with the compound in which a nitrogen-containing heterocycle can be introduced. Here, the term "part" means preferably 1 mol % or more, more preferably 50 mol % or more, still more preferably 80 mol % or more with respect to 100 mol % of the carbonyl-containing group. In this range, the effects resulting from the introduction of nitrogen-containing heterocycle can be enhanced, so that the tensile strength at the time of crosslinking can be more increased. It is particularly preferable to react the total amount (100 mol %) of the carbonyl-containing group with the compound because of excellent recycle property, tensile strength, and compression set (shape retention).

The elastomer modified with the carbonyl-containing group to be used may be commercially available, for example, maleic anhydride-modified isoprene rubbers such as LIR-403 (manufactured by Kuraray Co., Ltd.) and LIR-410A (manufactured by Kuraray Co., Ltd., trial product), carboxy-modified isoprene rubbers such as LIR-410 (manufactured by Kuraray Co., Ltd.), carboxy-modified nitrile rubbers such as Krynac 110, 221, and 231 (manufactured by Polysar Ltd.), carboxy-modified polybutenes such as CPIB (manufactured by Nippon Petrochemicals Co., Ltd.), HRPIB (manufactured by Nippon Petrochemicals Co., Ltd., trial product in laboratory), maleic anhydride-modified ethylene-propylene rubbers such as Nucrel (manufactured by Du Pont-Mitsui Fluorochemicals Co., Ltd.), Yukaron (manufactured by Mitsubishi Chemical Co., Ltd.) and Tafmer M (MA8510, manufactured by Mitsui Chemicals Co., Ltd.), maleic anhydride-modified ethylene-butene rubbers such as Tafmer M (MH7020, manufactured by Mitsui Chemicals Co., Ltd.), maleic anhydride modified polyethylenes such as Admer (LF128, etc., manufactured by Mitsui Chemicals Co., Ltd.), ADTEX series (maleic anhydride modified EVA, manufactured by Japan Polyolefines Co., Ltd.), HPR series (maleic anhydride modified EEA, manufactured by Du pont-Mitsui Polychemicals co., Ltd.), bondfast series (maleic anhydride modified ENA, manufactured by Sumitomo Chemical Co., Ltd.), dumiran series (maleic anhydride modified EVOH, manufactured by Takeda Chemical Industries Co., Ltd.), maleic anhydride-modified polypropylenes such as Admer (QB550, etc., manufactured by Mitsui Chemicals Co., Ltd.), and so on.

In addition, in the present invention, after reaction between the carbonyl-containing group and the compounds in which the nitrogen-containing heterocycle can be introduced, it may be introduced into the side chain of the elastomeric polymer.

In the case of synthesis for the thermoplastic elastomer in which a carbonyl-containing group and a nitrogen-containing heterocycle are independently included in side chains thereof, a monomer capable of forming the main chain of the elastomeric polymer and a monomer containing a carbonyl-containing group, and a monomer containing a nitrogen-containing heterocycle are copolymerized together, to thereby produce the thermoplastic elastomer directly. Alternatively, a main chain (elastomeric polymer) may be formed in advance by polymerization or the like, followed by a graft modification with the above-mentioned carbonyl-containing group and the compound in which the above-mentioned nitrogen-containing heterocycle can be introduced.

In each of the above-mentioned producing methods, whether each group in the side chain of the thermoplastic elastomer is bonded independently of other group or is bonded with other group may be confirmed by the generally-used analyzing means such as NMR or IR spectrum.

In the above-mentioned producing method for thermoplastic elastomer, as a preferable method, a carbonyl-containing group modified elastomeric polymer in which a carbonyl-containing group is introduced is prepared through the synthesis at first, followed by reacting the resulting elastomeric polymer with a compound in which the nitrogen-containing heterocycle can be introduced, to thereby introduce the nitrogen-containing heterocycle thereinto. In particular, an elastomeric polymer having cyclic acid anhydride on its side chain is brought into a reaction with a compound in which the nitrogen-containing heterocycle can be introduced at a temperature that allows a chemical reaction (e.g., a covalent bond or an ionic bond) between the compound in which the nitrogen-containing heterocycle can be introduced and the cyclic acid anhydride group. Therefore, it is preferable to introduce both the carbonyl-containing group and the nitrogen-containing heterocycle into the main chain of the elastomeric polymer (i.e., the cyclic acid ring opens). Details of the production of such an elastomer are disclosed in JP 2000-169527 A.

The nitrogen-containing heterocycle of the present invention is assumed as "nitrogen-containing n-membered ring compound ($n \geq 3$)" for convenience of description, and a bonding position of nitrogen-containing heterocycle is explained.

The bonding positions (1- to n-positions) described below are based on the IUPAC nomenclature. For instance, in the case of a compound having three nitrogen atoms having unshared electron pair, bonding positions are defined based on the order according to the IUPAC nomenclature. Specifically, the bonding positions have been shown in the nitrogen-containing heterocycle of the 5-membered ring, the 6-membered ring, and the condensed ring, respectively.

In the thermoplastic elastomer, the bonding position of the nitrogen-containing n-membered ring compound to be bonded to a main chain directly or indirectly through an organic group is not particularly limited, so that it may be bonded to any of bonding positions (1- to n-positions). Examples of preferable position include 1-position or 3- to n-positions.

When the number of nitrogen atoms included in the nitrogen-containing heterocycle is 1 (e.g., a pyridine ring), a chelate tends to be formed in the molecule, resulting in a decrease in the physical properties such as tensile strength at the time of forming the composition. Thus, 1- or 2-position is not preferable.

By selecting the bonding position of the nitrogen-containing heterocycle, in the thermoplastic elastomer, the crosslinking is easily formed through a hydrogen bond, an ionic bond, or a coordinate bond between the molecules of the thermoplastic elastomers or between the elastomer and the amino group-containing compounds. Therefore, the resulting composition has an excellent recycle property and an excellent mechanical characteristics and compression set (shape retention).

The composition of the present invention contains one or more thermoplastic elastomers. When two or more thermoplastic elastomers are contained, the mixing ratio thereof may be any ratio depending on the application of the resulting composition, the physical properties required for the composition, and the like.

The composition of the present invention may preferably contain carbon black and/or silica as a reinforcing agent.

The content of the carbon black (when the carbon black is used solely) is 1 to 200 parts by weight, preferably 10 to 100 parts by weight, more preferably 20 to 80 parts by weight with respect to 100 parts by weight of the thermoplastic elastomer.

The kinds of carbon black may favorably selected depending on the application thereof. In general, the carbon black can be classified into hard carbon and soft carbon depending on the particle sizes of the carbon black.

The soft carbon has a low reinforcing property to rubber, while the hard carbon has a high reinforcing property to rubber. In the present invention, it is particularly preferable to use the hard carbon having high reinforcing property.

The silica may include, although not particularly limited, fumed silica, calcined silica, precipitated silica, crushed silica, fused silica, diatomaceous earth, and so on. Among them, the precipitated silica is preferable. The content of the silica (when the silica is used solely) is 1 to 200 parts by weight, preferably 10 to 100 parts by weight, more preferably 20 to 80 parts by weight with respect to 100 parts by weight of thermoplastic elastomer.

When silica is used as reinforcing agent, silane coupling agents can be used together. As the silane coupling agents, for example, bis(triethoxysilylpropyl) tetrasulfide (Si69), bis(triethoxysilylpropyl) disulfide (Si75), γ-mercaptopropyl trimethoxysilane, or vinyltrimethoxysilane can be given. In addition, aminosilane compounds descrived above may be used.

In the case of using the silica and the carbon black in combination with the elastomer, the content (the total amount of carbon black and silica) is 1 to 200 parts by weight, preferably 10 to 100 parts by weight, more preferably 20 to 80 parts by weight with respect to 100 parts by weight of the thermoplastic elastomer.

The composition of the present invention may further contain, as needed, a polymer other than the elastomeric polymer of the present invention or various additives such as a reinforcing agent except the carbon black and the silica as described above, an anti-aging agent, an antioxidant, a pigment (dye), a plasticizer, a thixotropic agent, a UV absorber, a fire retardant, a solvent, a surfactant (including a leveling agent), a dispersant, a dehydrating agent, a anticorrosives, a tackifier, an antistatic agent, and a filler.

The above-mentioned additives and so on may be those generally used in the art, and some of specific examples will be listed below. However, the additives are not limited to the following only provided for exemplification.

The polymers, except for the thermoplastic elastomer used in the present invention, may preferably include those having the glass transition temperature of 25° C. or less by the above-mentioned reason, more preferably any one selected from the polymers used in the main chain of the present invention. More preferably, the polymers include natural rubber (NR), isoprene rubber (IR), butadiene rubber (BR), 1,2-butadiene rubber, styrene-butadiene rubber (SBR), acrylonitrile-butadiene rubber (NBR), butyl rubber (IIR), ethylene-propylene-diene rubber (EPDM), ethylene-propylene rubber (EPM), and ethylene-butene rubber (EBM), Ethylene-vinylacetate rubber (EVA), acrylic rubber (ACM), Ethylene-Acrylic rubber (AEM). Among them, in particular, it is preferable to use a polymer having no unsaturated bond of IIR, EPM, or EBM, or a polymer with few unsaturated bonds (e.g., EPDM). In addition, other polymers having portions capable of forming hydrogen bonds, such as polyester, polylactone, and polyamide are preferable. One kind or two or more kinds of those polymers may be contained. The content of the polymer is preferably 0.1 to 100 parts by weight, more preferably 1 to 50 parts by weight with respect to 100 parts by weight of the thermoplastic elastomer.

Reinforcing agents other than the carbon black and the silica include, for example, iron oxide, zinc oxide, aluminum oxide, titanium oxide, barium oxide, magnesium oxide, calcium carbonate, magnesium carbonate, zinc carbonate, Roseki clay, kaolin clay, and calcined clay. The content thereof is preferably 10 to 100 parts by weight, more preferably 20 to 80 parts by weight with respect to 100 parts by weight of the thermoplastic elastomer.

As the anti-aging agent, for example, hindered phenol type compounds, and aliphatic or aromatic hindered amine type compounds can be given. The content thereof is preferably 0.1 to 10 parts by weight, more preferably 1 to 5 parts by weight with respect to 100 parts by weight of the thermoplastic elastomer.

As the antioxidant, for example, butyl hydroxytoluene (BHT) or butyl hydroxyanisole (BHA) can be given. The content thereof is preferably 0.1 to 10 parts by weight, more preferably 1 to 5 parts by weight with respect to 100 parts by weight of thermoplastic elastomer.

As the pigment, for example, inorganic pigments such as titanium-dioxide, zinc oxide, ultramarine blue pigment, red iron oxide, lithopone, lead, cadmium, iron, cobalt, aluminum, chlorides or sulfates; and organic pigments such as azo pigments or copper phthalocyanine pigments can be given. The content thereof is preferably 0.1 to 10 parts by weight, more preferably 1 to 5 parts by weight with respect to 100 parts by weight of thermoplastic elastomer.

As the plasticizer, for example, derivatives of benzoic acid, phthalic acid, trimellitic acid, pyromellitic acid, adipic acid, sebacic acid, fumaric acid, maleic acid, itaconic acid, citric acid, and the like, and polyester, polyether, and epoxy can be given.

As the thixotropic agent, bentone, silicic anhydride, silicic derivatives, or urea derivatives can be given.

As the UV absorber, for example, 2-hydroxybenzophenon, benzotriazole, salicylate can be given.

As the fire retardant, for example, phosphorus compounds such as TCP; halogen compounds such as chlorinated paraffin, and perchloropentacyclodecane; antimony compounds such as antimony oxide; or aluminum hydroxides can be given.

The solvents include, for example, hydrocarbons such as hexane and toluene; halogenated hydrocarbons such tetrachloromethane; ketones such as acetone and methyl ethyl ketone; ethers such as diethyl ether and tetrahydrofuran; and esters such as ethyl acetate.

The surfactants (leveling agents) include, for example, polybutylacrylate, polydimethylsiloxane, modified silicon compounds, and fluorine-containing surfactants.

The dehydrating agents include vinyl silane and so on.

The anticorrosives includes, for example, zinc phosphate, tannic acid derivative, phosphate, basic sulfonate, and various kinds of anti-corrosive pigments.

The tackifiers include, for example, well-known silane coupling agents, silane compounds having alkoxysilyl groups, titanium coupling agent, and zirconium coupling agent. More specifically, for example, trimethoxy vinyl silane, vinyl triethoxysilane, vinyl tris(2-methoxy ethoxy) silane, γ-methacryloxypropyl trimethoxysilane, and 3-glycidoxypropyl trimethoxysilane are given.

The antistatic agents include, in general, quaternary ammonium salt or hydrophilic compounds such as polyglycol or ethylene oxide derivatives.

The content of the plasticizer is preferably 0.1 to 50 parts by weight, more preferably 1 to 30 parts by weight with respect to 100 parts by weight of the above-mentioned thermoplastic elastomer. The content of other additives are preferably 0.1 to 10 parts by weight, more preferably 1 to 5 parts by weight with respect to 100 parts by weight of the above-mentioned thermoplastic elastomer.

Some of thermoplastic elastomers of the present invention are capable of self crosslinking. However, within the scope of the present invention, a curing agent, a accelerator activator, vulcanization accelerator, a retarder, or the like can be used together.

As the curing agents, for example, curing agents such as sulfurs, organic peroxides, metallic oxides, phenolic resins, or quinone dioxime can be given.

As the curing agents of sulfurs, for example, powdered sulfur, precipitating sulfur, highly dispersible sulfur, surface-treated sulfur, insoluble sulfur, dimorpholine disulfide, or alkylphenol disulfide can be given.

As the curing agents of organic peroxides, for example, benzoylperoxide, t-butyl hydroperoxide, 2,4-dichlorobenzoylperoxide, 2,5-dimethyl-2, 5-di(t-butylperoxy)hexane, and 2,5-dimethylhexane-2,5-di(peroxyl benzoate) can be given.

As other examples, magnesium oxide, litharge (lead oxide), p-quinone dioxime, tetrachloro-p-benzoquinone, p-dibenzoylquinone dioxime, poly-p-dinitrosobenzene, or methylene dianiline can be given.

As the accelerator activators, zinc oxide, magnesium oxide, amines, fatty acids such as acetyl acid, propionic acid, butanoic acid, stearic acid, acrylic acid or maleic acid; and zinc salts of fatty acid such as zinc acetylate, zinc propionate, zinc butanoate, zinc stearate, zinc acrylate or zinc maleate can be given.

As the vulcanization accelerator, for example, thiurams such as tetramethylthiuram disulfide (TMTD) or tetraethylthiuram disulfide (TETD); aldehyde-ammonias such as hexamethylenetetramine; guanidines such as diphenylguanidine; thiazoles such as 2-mercaptbenzothiazole (MBT), dibenzothiazyldisulfide (DM); and sulfenamides such as cyclohexylbenzothiazyl sulfonamide (CBS), N-t-butyl-2-benzothiazyl sulfonamide (BBS) can be given. Alkylphenol resins, and halides thereof can also be used.

As the retarder, for example, organic acids such as phthalic anhydride, benzoic acid, salicylic acid, and acetylsalicylic acid; nitroso compounds such as N-nitrosodiphenylamine, N-nitrosophenyl-β-naphthylamine, and polymer of N-nitrosotrimethyldihydroquinoline; halides such as trichloro melanin; 2-mercaptobenzoimidazol; or N-(cyclohexylthio)phtalimide (santo guard PVI) are given.

The content of each of those curing agents is preferably 0.1 to 20 parts by weight, more preferably 1 to 10 parts by weight with respect to 100 parts by weight of thermoplastic elastomer.

The method of producing the composition of the present invention is-not limited specifically. For instance, the above-mentioned thermoplastic elastomer, the above-mentioned amino group-containing compound, various kinds of additives if required, and so on may be mixed using roller, kneader, extruder, universal stirrer, or the like.

Here, in the case-of using the amino group-containing compound of the first embodiment, the time for adding the compound is not particularly limited.

When the same compound as the nitrogen-containing heterocycle of the thermoplastic elastomer is used as the amino group-containing compound of the first embodiment, (i) the thermoplastic elastomer of the present invention may be produced at first according to the above method and then mixed with the amino group-containing compound, or (ii) a predetermined amount (excess amount) of nitrogen-containing heterocycle (amino group-containing compound) may be mixed in advance at the time of producing the thermoplastic elastomer of the present invention.

If the nitrogen-containing heterocycle and the amino group-containing compound are different from each other, the composition can be produced by the method of the above item (i).

The curing conditions for a permanent crosslinking of the composition of the present invention (by a curing agent) may be favorably selected depending on the various kinds of components or the like to be blended, but are not limited to specific conditions. For example, preferable curing conditions include the conditions under which the curing is performed for 5 to 30 minutes at a temperature of 130 to 200° C.

The composition of the present invention can be softened and imparted with fluidity by heating at about 80 to 230° C. to dissociate the three-dimensional crosslinking bond (crosslinking structure). It is considered that the interaction between the side chains, or the side chains and the nitrogen-containing compounds formed between the molecules or formed in the molecule becomes weakened.

For example, the composition of the present invention can utilize the rubber elasticity for various kinds of rubber uses. It is preferable to use-the composition as a hot-melt adhesive or an additive to be mixed therewith because the heat-resistance and recycle properties can be increased. It can be used preferably, in particular, for the automobile parts and so on.

More specifically, the automobile parts include, for example, parts of tire such as a tread of a tire, carcass, side wall, inner liner, under tread, and belt portion; exterior parts such as radiator grill, side molding, garnish (pillar, rear, cowl top), aeroparts (air dam, spoiler), wheel cover, weather strip, cowbelt grill, air outlet louver, air scoop, hood bulge, ventilator part, anticorrosion countermeasure parts (over-fender, side seal panel, molding (window, hood, door belt)), marks; interior window flame parts such as door, light, weather strip of wiper, glassrun, glass-run channel; air duct hose, radiator hose, break hose; lubricant-series parts such as crankshaft seal, valve stem seal, head cover gasket, A/T oil cooler hose, transmission oil seal, P/S hose, P/S oil seal; fuel-series parts such as hose for fuel, emission control hose, inlet filler hose, diaphragms; vibration-proof parts such as engine mount, intank pump mount; boots such as CVJ boot, rack & pinion boot; air conditioning parts such as A/C hose, A/C seal; belt parts such as timing belt, belt for supplementary machine; sealers such as windshield sealer, vinyl plastic sol sealer, anaerobic sealer, body sealer, spot weld sealer; and the like.

When the composition of the present invention is contained as a rubber modifier such as flow preventive, in resins or rubbers causing cold flow at room temperature, flow in extrusion or cold flow can be prevented.

Furthermore, the composition of the present invention can be particularly preferably used in the applications of tires, hoses, belts, seats, vibration-proof rubbers, rollers, linings, rubberized fabrics, sealing members, gloves, fenders, and so on by containing carbon black and/or silica, to thereby provide the product with increased tensile strength, tear strength, flexural strength, and so on.

The composition of the present invention retains excellent recycle property and shows excellent physical properties such as mechanical characteristics and compression set (shape retention) because the composition contains the amino group-containing compound.

Therefore, among the applications described above, the composition of the present invention is particularly suitable for an application where the recycle property is requested.

EXAMPLES

Hereinafter, the present invention will be more specifically described based on examples. However, the present invention is not limited to the following examples.

Examples 1 to 14 and Comparative Examples 1 to 3

<Synthesis of Thermoplastic Elastomer 1>

A thermoplastic elastomer 1 was synthesized by the following method.

Added to 12.73 g (6.55 mmol) of commercially available maleic anhydride-modified isopene rubber (LIR-410A, produced by Kuraray Co., Ltd., modification rate: 2.7 mol %) was 0.551 g (6.55 mmol) of 3-amino-1,2,4-triazole, and the whole was stirred under heat at 160° C. for 1 hour.

The reaction product was subjected to NMR and IR to be identified as a thermoplastic elastomer 1 having the following structure (formula (4)).

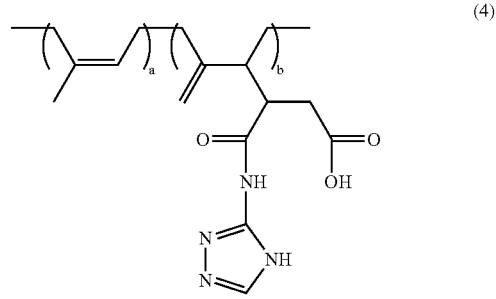

(4)

a:b = 97.3:2.7

<Preparation of Thermoplastic Elastomer Composition>

Next, the thermoplastic elastomer 1 was mixed with the amino group-containing compound according to the first embodiment shown in Table 1 at an equivalent ratio of nitrogen atoms in the compound with respect to the side chain of the elastomer 1 shown in Table 1 (represented as "Equivalent ratio" in Table 1) and the resultant was heated with stirring and well-mixed according to the conditions shown in Table 1, resulting in a thermoplastic elastomer composition.

For each of Comparative Examples 2 and 3, the equivalent ratio of hydroxyl groups in the compound with respect to the side chain of the elastomer 1 is shown in the column of "Equivalent ratio" in Table 1.

The hardness and shape retention of each composition thus obtained were measured. In addition, the recycle property was evaluated. The results are shown in Table 1.

<JIS A Hardness>

The obtained thermoplastic elastomer compositions were subjected to a press molding at 100° C. for 20 minutes, followed by forming a cylindrical sample of 29 mm in diameter and 12.5 mm in thickness. Using the sample, JIS A hardness was measured in accordance with JIS K6253.

In Table 1, the term "liquefied" in Table 1 indicates that the test could not be carried out because the thermoplastic elastomer composition was liquefied and the sample could not be prepared.

<Shape retention>

A glass plate was placed on the cylindrical sample obtained above and then 500 g of a weight was placed thereon, followed by measuring the thickness of the cylindrical sample after 48 hours. The shape retention was calculated based on the measured thickness by the following equation.

Shape retention (%)=(thickness after 48 hours/12.5 mm)×100

Here, in Table 1, "–" represents that the cylindrical sample could not be formed and the shape retention could not be measured.

<Recycle Property (Softening Temperature)>

The cylindrical sample obtained above was heated at a temperature-increase rate of 10° C./min. In addition, the softening temperature was defined as a temperature at which the sample was softened and deformed.

Note that in Table 1, "–" represents that the cylindrical sample could not be formed and the softening temperature could not be measured.

Furthermore, it was confirmed that each of the compositions of Examples 1 to 14 could be softened repeatedly at softening temperatures shown in Table 1.

TABLE 1

| | Amino group-containing compound (1st embodiment) | | | | | Recycle property (Softening temperature (° C.)) | Shape retention (%) |
|---|---|---|---|---|---|---|---|
| | Attribution | Compound name | Equivalent ratio | Conditions | Hardness | | |
| Example 1 | Heterocyclic + primary aromatic amine | 3-amino-1,2,4-triazole | 4 | 150° C., 1 h | 58 | 120 | 75 |
| Example 2 | Heterocyclic + primary aromatic amine | 3-amino-1,2,4-triazole | 8 | 150° C., 1 h | 55 | 100 | 90 |
| Example 3 | Heterocyclic diamine | 4,4'-dipyridyl | 2 | 150° C., 1 h | 52 | 90 | 60 |
| Example 4 | Heterocyclic diamine | 4,4'-dipyridyl | 4 | 150° C., 1 h | 50 | 80 | 55 |
| Example 5 | Heterocyclic + primary aromatic amine | 4-aminopyridine | 2 | 150° C., 1 h | 53 | 90 | 62 |
| Example 6 | Heterocyclic + primary aromatic amine | 4-aminopyridine | 4 | 150° C., 1 h | 51 | 80 | 57 |
| Example 7 | Primary aliphatic amine | Dodecylamine | 1 | 150° C., 1 h | 51 | 80 | 58 |
| Example 8 | Primary aliphatic amine | Dodecylamine | 2 | 150° C., 1 h | 50 | 70 | 52 |
| Example 9 | Tertiary aliphatic diamine | Tetramethyl-1,6-hexanediamine | 0.3 | 120° C., 1 h | 52 | 90 | 61 |
| Example 10 | Tertiary aliphatic diamine | Tetramethyl-1,6-hexanediamine | 1 | 120° C., 1 h | 53 | 100 | 70 |
| Example 11 | Tertiary aliphatic diamine | Tetramethyl-1,6-hexanediamine | 2 | 120° C., 1 h | 55 | 130 | 94 |
| Example 12 | Secondary aliphatic diamine | N,N'-dimethyl-1,6-hexanediame | 0.3 | 120° C., 1 h | 58 | 130 | 95 |
| Example 13 | Secondary aliphatic diamine | N,N'-dimethyl-1,6-hexanediame | 1 | 120° C., 1 h | 60 | 150 | 97 |
| Example 14 | Secondary aliphatic diamine | N,N'-dimethyl-1,6-hexanediame | 2 | 120° C., 1 h | 62 | 180 | 98 |
| Comparative Example 1 | Non | — | — | 120° C., 1 h | 48 | 60 | 25 |
| Comparative Example 2 | Aliphatic alcohol | 2,5-hexadiol | 2 | 230° C., 1 h | liquefied | — | — |
| Comparative Example 3 | Aromatic alcohol | Bisphenol A | 2 | 200° C., 1 h | liquefied | — | — |

Examples 15, 16 and Comparative Examples 4, 5

<Synthesis of Thermoplastic Elastomer 2>

A thermoplastic elastomer 2 was synthesized by the following method.

4H-3-amino-1,2,4-triazole (manufactured by Nippon Carbide Industries Co., Inc.) in an amount of 1.88 g (22.4 mmol) was added in 100 g of maleic anhydride modified ethylene-propylene copolymer (manufactured by DSM Co., Ltd., trial product, ethylene content: 60 mol %, maleic anhydride modification ratio: 0.8 mol %, and weight average molecular weight: 90,000) (maleic anhydride moiety: 22.4 mmol), followed by kneading with a kneader for 30 to 35 minutes at 170° C.

The reaction product was subjected to NMR and IR to be identified as a thermoplastic elastomer 2 having the following structure (formula (5)). In formula (5), E represents an ethylene moiety or a propylene moiety.

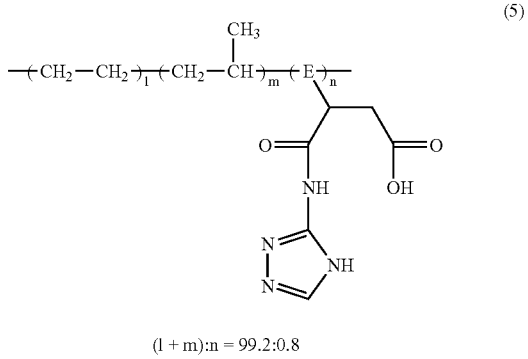

(l + m):n = 99.2:0.8

<Preparation of Thermoplastic Elastomer Composition>

The obtained thermoplastic elastomer 2, the amino group-containing compound (3-amino-1,2,4-triazole) according to the first embodiment, and carbon black were mixed (kneaded) together by heating them with stirring for 20 minutes at 150° C. at an equivalent ratio of nitrogen atoms in the compound with respect to the side chain of the elastomer 2 shown in Table 2 (represented as "Equivalent ratio" in Table 2) or with a content (parts by weight) with respect to the elastomer 2 to obtain an elastomer composition.

The hardness and compression set of each composition thus obtained were measured by the following methods. In addition, the recycle property (repetitive molding test) was evaluated by the following method. The results are shown in Table 2.

<JIS A Hardness>

The obtained thermoplastic elastomer composition was subjected to press molding at 150° C. for 60 minutes, followed by forming a flat plate sample measuring 5 cm (length)×5 cm (width)×1 cm (thickness). The three flat plate samples thus obtained were superimposed, and JIS A hardness was measured in accordance with JIS K6253.

<Compression Set (C-Set)>

For each of the thermoplastic elastomer compositions described above, a plurality of sheets of 2 mm in thickness were formed through hot press for 30 minutes at 180° C. Seven sheets were superimposed one after another and subjected to the hot press for 20 minutes at 180° C. to thereby prepared a cylindrical sample of 29 mm in diameter and 12.5 mm in thickness.

The resulting sample was compressed by 25% with a dedicated jig, and was then left to stand for 22 hours at 70° C. Subsequently, the compression set of the sample was measured according to JIS K 6262.

<Recycle Property (Repetitive Molding Examination)>

For each of the thermoplastic elastomer compositions, a sheet of 2 mm in thickness was prepared by hot-pressing the composition for 10 minutes at 170° C. Then, the sample in sheet shape was cut into small pieces and was then subjected to press-molding again. The elastomer composition was evaluated in terms of the number of times a seamless sample as an integrated product could be made. Evaluations are based on following.

"○" means that the seamless samples were prepared repeatedly 10 times or more;

"Δ" means that the seamless samples were prepared repeatedly 8 to 9 times.

TABLE 2

|  | Example 15 | Comparative Example 4 | Example 16 | Comparative Example 5 |
|---|---|---|---|---|
| Thermoplastic elastomer 2 (parts by weight) | 100 | 100 | 100 | 100 |
| 3-amino-1,2,4-triazole (Equivalent ratio) | 4 | 0 | 4 | 0 |
| Carbon black | 0 | 0 | 10 | 10 |
| Hardness | 49 | 46 | 53 | 46 |
| Recycle property | ○ | ○ | ○ | ○ |
| Compression set (%) | 92 | 97 | 93 | 98 |

As is apparent from Table 1 and Table 2, the composition of the present invention has a low softening point and does not impair its recycle property, while improving the hardness (mechanical characteristics) and imparting excellent compression set (shape retention). In addition, the composition containing the carbon black showed similar results. Therefore, the composition of the present invention can be suitably used for the above applications.

Furthermore, in each of Examples 15 and 16 and Comparative Examples 4 and 5, using an elastomer composition obtained by changing the kneading conditions at the time of preparing the thermoplastic elastomer composition to the conditions of 170° C. for 25 minutes, the same test as the above was performed while changing the sample-preparation conditions (press conditions) to the following conditions for each test of JIS A hardness, compression set (C-Set), and recycle property (repetitive molding test). However, almost the same results (tendencies) as described above were obtained.

In the measurement of JIS A hardness and the test of the recycle property (repetitive molding test), the sample-preparation conditions were set to 200° C. for 10 minutes. In addition, for measuring the compression set (C-Set), the conditions of preparing a cylindrical sample was set such that a sheet having a thickness of 2 mm was prepared by press molding at 200° C. for 10 minutes and then the seven sheets were superimposed at 200° C. for 10 minutes.

Examples 17 to 20 and Comparative Example 6

<Preparation of Thermoplastic Elastomer Composition>

The thermoplastic elastomer 2 obtained above, the amino group-containing compound (N, N'-dimethyl-1,6-hexanediamine) according to the first embodiment, and carbon black were kneaded under heating with a kneader for 30 minutes at 200° C. at an equivalent ratio of nitrogen atoms in the compound with respect to the side chain of the elastomer 2 shown in Table 3 (represented as "Equivalent ratio" in Table 3) or with a content (parts by weight) with respect to the elastomer 2 to obtain an elastomer composition.

The hardness and compression set of each composition thus obtained were measured by the same method as in Example 15 above. In addition, the recycle property (repetitive molding test) was evaluated by the same method as in Example 15 above. The results are shown in Table 3.

TABLE 3

|  | Example 17 | Example 18 | Example 19 | Example 20 | Comparative Example 20 |
|---|---|---|---|---|---|
| Thermoplastic elastomer 2 (parts by weight) | 100 | 100 | 100 | 100 | 100 |
| N,N'-dimethyl-1,6-hexanediame (Equivalent ratio) | 0.4 | 0.6 | 0.8 | 1.2 | 0 |
| Carbon black | 10 | 10 | 10 | 10 | 10 |
| Hardness | 54 | 53 | 55 | 54 | 42 |
| Recycle property | ○ | ○ | ○ | Δ | ○ |
| Compression set (%) | 87 | 85 | 78 | 57 | 95 |

As is apparent from Table 3, the compression set and hardness of the composition of the present invention can be improved by including the amino group-containing compound according to the first embodiment, allowing the composition to retain the excellent recycle property. In particular, the effect of improving the compression set was increased as the content of the amino group-containing compound according to the first embodiment was increased.

In other words, it is possible to adjust the content to the arbitrary content of amino group-containing compound, with which suitable physical properties can be exerted, while considering the improvement effect according to the application of the composition of the present invention, the desired physical properties, and so on.

Examples 21 to 30 and Comparative Example 7

<Preparation of Thermoplastic Elastomer Composition>

The thermoplastic elastomer 2 obtained above and the amino group-containing compound according to the first embodiment shown in Table 4 were kneaded under heating with the kneader for 30 minutes at 200° C. at an equivalent ratio of nitrogen atoms in the compound with respect to the side chain of the elastomer 2 shown in Table 4 (represented as "Equivalent ratio" in Table 4) to obtain an elastomer composition.

The compression set of each composition thus obtained were measured by the same method as in Example 15 above. In addition, the recycle property (repetitive molding test) was evaluated by the same method as in Example 15 above. Further, a tensile test was performed by the following methods. The results are shown in Table 4.

<Tensile Test>

A sheet of 2 mm in thickness was formed by hot press at 200° C. for 10 minutes. Then, No. 3 dumbbell-shaped test pieces were punched from the sheet and the tensile test was performed at a tensile speed of 500 mm/min based on JIS K 6251. At room temperature, the following as measured: 50% modulus ($M_{50}$), 100% modulus ($M_{100}$), 200% modulus ($M_{200}$), 300% modulus ($M_{300}$), 400% modulus ($M_{400}$), breaking strength ($T_B$), and breaking elongation ($E_B$).

TABLE 4

|  | Example 21 | Example 22 | Example 23 | Example 24 | Example 25 | Example 26 | Example 27 | Example 28 | Example 29 | Example 30 | Comparative Example 7 |
|---|---|---|---|---|---|---|---|---|---|---|---|
| Thermoplastic elastomer 2 (parts by weight) | 100 | 100 | 100 | 100 | 100 | 100 | 100 | 100 | 100 | 100 | 100 |
| N,N'-dimethyl-1,6-hexanediame (Equivalent ratio) | 0.25 | 0.5 | 0.75 | 1.0 | 2.0 |  |  |  |  |  |  |
| N,N'-diethyl-1,6-hexanediame (Equivalent ratio) |  |  |  |  |  | 0.25 | 0.5 |  |  |  |  |
| N,N'-diisopropyl-1,3-propanediamine (Equivalent ratio) |  |  |  |  |  |  |  | 0.25 | 0.5 | 1.0 |  |
| Compression set (%) | 90 | 75 | 67 | 57 | 51 | 89 | 81 | 98 | 95 | 93 | 96 |
| $M_{50}$ (Mpa) | 0.7 | 0.8 | 0.8 | 0.8 | 0.8 | 0.8 | 0.7 | 0.7 | 0.8 | 0.8 | 0.7 |
| $M_{100}$ (Mpa) | 1.0 | 1.1 | 1.1 | 1.1 | 1.1 | 1.1 | 1.0 | 1.0 | 1.0 | 1.1 | 1.0 |
| $M_{200}$ (Mpa) | 1.3 | 1.6 | 1.7 | 1.7 | 1.5 | 1.6 | 1.3 | 1.3 | 1.4 | 1.6 | 1.3 |
| $M_{300}$ (Mpa) | 1.7 | 2.2 | 2.3 | 2.5 | 2.1 | 2.0 | 1.7 | 1.6 | 1.8 | 2.0 | 1.5 |
| $M_{400}$ (Mpa) | 2.1 | 2.8 | 3.1 | 3.4 | 2.9 | 2.4 | 2.1 | 1.9 | 2.1 | 2.4 | 1.8 |
| $T_B$ (Mpa) | 3.0 | 3.2 | 3.2 | 3.8 | 3.5 | 2.8 | 3.9 | 2.6 | 2.9 | 2.9 | 2.4 |
| $E_B$ (%) | 640 | 450 | 410 | 440 | 460 | 500 | 750 | 670 | 680 | 560 | 590 |
| Recycle property | ○ | ○ | ○ | ○ | Δ | ○ | ○ | ○ | ○ | ○ | ○ |

As is apparent from Table 4, the compression set, and mechanical characteristics of the composition of the present invention can be improved by including the amino group-containing compound according to the first embodiment, allowing the composition to retain the excellent recycle property. In addition, the effect of improving the compression set similar to Examples 17 to 20 was exhibited. In other words, it is possible to adjust the content to the arbitrary content of amino group-containing compound, with which suitable physical properties can be exerted while considering the improvement effect according to the application of the composition of the present invention, the desired physical properties, and so on.

Examples 31 to 34 and Comparative Example 8

<Synthesis of Amino Group-Containing Compounds (Polysiloxane having the Amino-Group) According to the Second Embodiment 2-1 to 2-4>

27 g (1.5 mol) of water was added to 111.18 g (0.5 mol) of N-(β-aminoethyl)-γ-aminopropyltrimethoxysilane (A-1120, produced by Nippon Unicar Co., Ltd.) and then the mixture was stirred for 1 hour at room temperature, followed by stirring for 5 hours at 80° C.

The stirring was terminated and then the resultant was dried in a vacuum oven under a reduced pressure at 60° C. for 15 hours, resulting in 76 g of white-solid polysiloxane having an amino group 2-1 in 99% yield.

21.6 g (1.2 mol) of water was added to 136.62 g (0.4 mol) of N, N-bis[(3-trimethoxysilyl)propyl]amine (A-1170, produced by Nippon Unicar Co., Ltd.) and then the mixture was stirred for 1 hour at room temperature, followed by stirring for 5 hours at 80° C.

The stirring was terminated and then the resultant was dried in a vacuum oven under the reduced pressure at 60° C. for 15 hours, resulting in 84 g of white-solid polysiloxane having an amino group 2-2 in 103% yield.

27 g (1.5 mol) of water was added to 117.5 g (0.5 mol) of 3-(n-butylamino)propyltrimethoxysilane (Dynasilane 1189, produced by Degussa-Hüls AG Corporation) and then the mixture was stirred for 1 hour at room temperature, followed by stirring for 96 hours at 80° C.

The stirring was terminated and then the sample was dried in a vacuum oven under the reduced pressure at 60° C. for 15 hours, resulting in 76 g of white-solid polysiloxane having an amino group 2-3 in 92% yield.

37.8 g (2.1 mol) of water was added to 125.5 g (0.7 mol) of γ-aminopropyltrimethoxysilane (A-1110, produced by Nippon Unicar Co., Ltd.) and then the mixture was stirred for 1 hour at room temperature, followed by stirring for 96 hours at 80° C.

The stirring was terminated and then the resultant was dried in a vacuum oven under the reduced pressure at 60° C. for 15 hours, resulting in 81 g of white-solid polysiloxane having an amino group 2-4 in 105% yield.

<Preparation of Thermoplastic Elastomer Composition>

The thermoplastic elastomer 2 obtained above and the amino group-containing polysiloxane or silica gel (nipsil LP, produced by Nippon Silica Industrial Co., Ltd.) were kneaded under heating with the kneader for 20 minutes at 200° C. at a content (parts by weight) with respect to the elastomer 2 (100 parts by weight) shown in Table 5 to obtain an elastomer composition.

TABLE 5

|  | Example 31 | Example 32 | Example 33 | Example 34 | Comparative Example 8 |
|---|---|---|---|---|---|
| Thermoplastic elastomer 2 (parts by weight) | 100 | 100 | 100 | 100 | 100 |
| Polysiloxane having amino group (parts by weight) | 2-1 | 2-2 | 2-3 | 2-4 |  |
| Silica (parts by weight) | 10 | 10 | 10 | 10 | 10 |

The recycle property (repetitive molding test) of each composition thus obtained was evaluated by the same method as that of Example 15 above, and the hardness and compression set were measured by the same method as that of Example 15 above, and the tensile test was performed by the same method as that of Example 21 above. The results are shown in Table 6.

TABLE 6

|  | Example 31 | Example 32 | Example 33 | Example 34 | Comparative Example 8 |
|---|---|---|---|---|---|
| Compression set (%) | 49 | 89 | 76 | 85 | 92 |
| Hardness | 59 | 58 | 57 | 57 | 59 |
| $M_{50}$ (Mpa) | 1.0 | 0.9 | 0.8 | 0.9 | 0.9 |
| $M_{100}$ (Mpa) | 1.6 | 1.2 | 1.2 | 1.3 | 1.2 |
| $M_{200}$ (Mpa) | 2.8 | 1.7 | 1.8 | 1.8 | 1.6 |
| $M_{300}$ (Mpa) | — | 2.1 | 2.4 | 2.3 | 2.0 |
| $M_{400}$ (Mpa) | — | 2.6 | — | 2.7 | 2.3 |
| $T_B$ (Mpa) | 3.1 | 2.7 | 2.9 | 2.9 | 2.6 |
| $E_B$ (%) | 230 | 440 | 390 | 500 | 530 |
| Recycle property | ◯ | ◯ | ◯ | ◯ | ◯ |

As is apparent from Table 6, each of the compositions (Examples 31 to 34) that contain the amino group-containing compounds according to the second embodiment showed excellent compression set and recycle property, and also showed effects of improving hardness and mechanical characteristics as compared with the composition of Comparative Example 8.

Note that, in the present invention, Diablack G (produced by Tokai Carbon Co., Ltd.) was used as a carbon black, and the following compounds were used as amino group-containing compounds.

4H-3-amino-1,2,4-triazole (produced by Nippon Carbide Industries Co., Ltd.); 4,4'-dipyridyl (produced by Tokyo Kasei Co., Ltd.); 4-aminopyridine (produced by Tokyo Kasei Co., Ltd.); dodecylamine (produced by Tokyo Kasei Co., Ltd.); tetramethyl-1,6-hexanediamine (produced by Tokyo Kasei Co., Ltd.); N,N'-dimethyl-1,6-hexanediamine (produced by Tokyo Kasei Co., Ltd.); N,N'-diethyl-1,6-hexanediamine (produced by Tokyo Kasei Co., Ltd.); N,N'-diisopropyl-1,3-propanediamine (produced by Tokyo Kasei Co., Ltd.); 2,5-hexanediol (produced by Tokyo Kasei Co., Ltd.); and biphenol A (produced by Tokyo Kasei Co., Ltd.).

According to the present invention, the thermoplastic elastomer composition retaining the excellent recycle property and also having the excellent mechanical characteristics and compression set (shape retention) can be provided.

What is claimed is:

1. A thermoplastic elastomer composition comprising:
a thermoplastic elastomer having a carbonyl-containing group and a nitrogen-containing heterocycle in a side chain thereof; and
an amino group-containing compound,
wherein said amino group-containing compound is selected from the group consisting of methylamine, ethylamine, propylamine, butylamine, hexylamine, octylamine, nonylamine, decylamine, dodecylamine, tridecylamine, tetradecylamine, pentadecylamine, hexadecylamine, cetylamine, laurylamine, stearylamine, oleylamine, dimethylamine, trimethylamine, benzyldimethylamine, methylenediamine, ethylenediamine, tetramethyl-1,6-hexanediamine, xylylenediamine, tetramethylxylylenediamine, diethylenetriamine, diethylaminopropylamine, N-aminoethylpiperazine, tris(dimethylaminomethyl)phenol, triethylenetetramine, N,N'-dimethylethylenediamine, N,N'-diethylethylenediamine, N,N'-diisopropylethylenediamine, N,N'-dimethyl-1,3-propanediamine, N,N'-diethyl-1,3-propanediamine, N,N'-diisopropyl-1,3-propanediamine, N,N'-dimethyl-1,6-hexanediamine, N,N'-diethyl-1,6-hexanediamine, N,N',N"-trimethylbis(hexamethylene)triamine, dipyridylamine, dipyridyl, ethylenedipyridyl, trimethylenedipyridyl, phenazine, purine, pteridin, dipyridylamine, 1,2-bis-(4-pyridyl)-ethane, 2 (or 4)-($\beta$-hydroxyethyl)-pyridine, 2 (or 4)-(2-aminoethyl)-pyridine, 2 (or 4)-aminopyridine, 2,6-diaminopyridine, 2-amino-6-hydroxypyridine, 6-azathymine, metaphenylenediamine, diaminodiphenylmethane, diaminodiphenylsulfone, 3-amino-1,2,4-triazole, polyamide, polyurethane, urea resin, melamine resin, polyvinylamine, polyallylamine, polyacrylamide, polymethacrylamide, polyaminostyrene, and amino group-containing polysiloxane,
wherein one or more hydrogen atoms of the amino group-containing compound can be substituted by an alkyl group, an alkylene group, an aralkylene group, an oxy group, an acyl group or a halogen atom, and a hetero atom can be added into a skeleton of the amino group-containing compound.

2. The thermoplastic elastomer composition according to claim 1, wherein
the side chain has a structure represented by the following chemical formula (1):

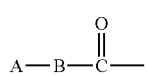

(1)

(wherein A represents the nitrogen-containing heterocycle, and B represents: a single bond; an oxygen atom, a nitrogen-containing group, or a sulfur atom; or an organic group which can include the atoms or the group).

3. The thermoplastic elastomer composition according to claim 1, wherein
the side chain has a structure in which the side chain is bonded to a main chain at $\alpha$-position or $\beta$-position and which is represented by the following chemical formula (2) or (3):

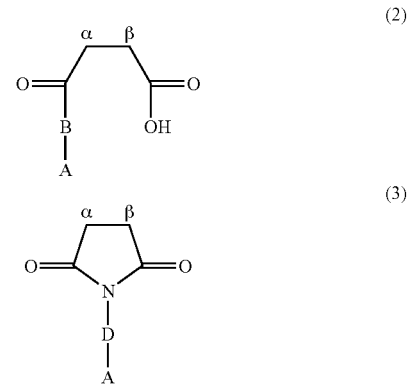

(wherein A represents the nitrogen-containing heterocycle, and B and D independently represent: a single bond; an oxygen atom, a nitrogen-containing group, or a sulfur atom; or an organic group which can include the atoms or the group).

4. The thermoplastic elastomer composition according to claim 1, wherein
the nitrogen-containing heterocycle contained in said side chain is a five-membered ring or a six-membered ring.

5. The thermoplastic elastomer composition according to claim 4, wherein
the nitrogen-containing heterocycle contained in said side chain is selected from the group consisting of a triazole ring, a thiadiazole ring, a pyridine ring, and imidazole ring.

6. The thermoplastic elastomer composition according to claim 1, further comprising:
at least one of carbon black and silica in 1 to 200 parts by weight with respect to 100 parts by weight of the thermoplastic elastomer.

7. A thermoplastic elastomer composition comprising:
a thermoplastic elastomer having a carbonyl-containing group and a nitrogen-containing heterocycle in a side chain thereof; and
an amino group-containing compound,
wherein the amino group-containing compound is selected from the group consisting of a secondary aliphatic diamine, a polyamine containing a primary aromatic amine and a heterocyclic amine, and a tertiary heterocyclic diamine.

8. The thermoplastic elastomer composition according to claim 7, wherein
the side chain has a structure represented by the following chemical formula (1):

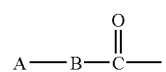

(1)

(wherein A represents the nitrogen-containing heterocycle, and B represents: a single bond; an oxygen atom, a nitrogen-containing group, or a sulfur atom; or an organic group which can include the atoms or the group).

9. The thermoplastic elastomer composition according to claim 7, wherein
the side chain has a structure in which the side chain is bonded to a main chain at α-position or β-position and which is represented by the following chemical formula (2) or (3):

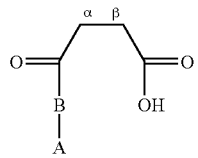

(2)

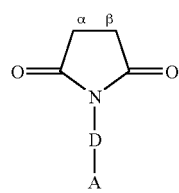

(3)

(wherein A represents the nitrogen-containing heterocycle, and B and D independently represent: a single bond; an oxygen atom, a nitrogen-containing group, or a sulfur atom; or an organic group which can include the atoms or the group).

10. A thermoplastic elastomer composition comprising:
a thermoplastic elastomer having a carbonyl-containing group and a nitrogen-containing heterocycle in a side chain thereof; and
an amino group-containing compound,
wherein the amino group-containing compound is polysiloxane having an amino group.

11. The thermoplastic elastomer composition according to claim 10, wherein
the side chain has a structure represented by the following chemical formula (1):

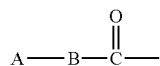

(1)

(wherein A represents the nitrogen-containing heterocycle, and B represents: a single bond; an oxygen atom, a nitrogen-containing group, or a sulfur atom; or an organic group which can include the atoms or the group).

12. The thermoplastic elastomer composition according to claim 11, wherein
the polysiloxane having the amino group is a condensate of an aminosilane compound.

13. The thermoplastic elastomer composition according to claim 10, wherein
the side chain has a structure in which the side chain is bonded to a main chain at α-position or β-position and which is represented by the following chemical formula (2) or (3):

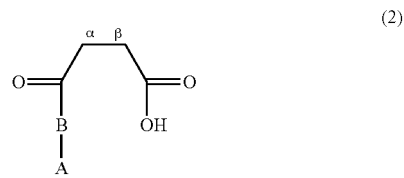

(2)

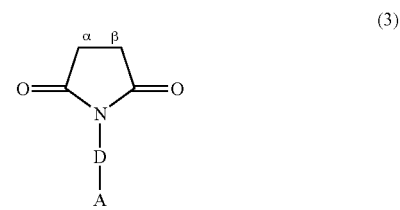

(3)

(wherein A represents the nitrogen-containing heterocycle, and B and D independently represent: a single bond; an oxygen atom, a nitrogen-containing group, or a sulfur atom; or an organic group which can include the atoms or the group).

14. The thermoplastic elastomer composition according to claim 13, wherein
the polysiloxane having the amino group is a condensate of an aminosilane compound.

15. The thermoplastic elastomer composition according to claim 10, further comprising:
at least one of carbon black and silica in 1 to 200 parts by weight with respect to 100 parts by weight of the in thermoplastic elastomer.

16. The thermoplastic elastomer composition according to claim 10, wherein
the polysiloxane having the amino group is a condensate of an aminosilane compound.

17. The thermoplastic elastomer composition according to claim 16, wherein
a content of the polysiloxane having the amino group is from 1 to 200 parts by weight with respect to 100 parts by weight of the thermoplastic elastomer.

18. The thermoplastic elastomer composition according to claim 10, wherein
a content of the polysiloxane having the amino group is from 1 to 200 parts by weight with respect to 100 parts by weight of the thermoplastic elastomer.

* * * * *